(12) United States Patent
Entwistle et al.

(10) Patent No.: US 12,522,505 B2
(45) Date of Patent: Jan. 13, 2026

(54) METHODS AND APPARATUS OF PRODUCING SILICON NANOPARTICLES

(71) Applicant: Ionic Mineral Technologies, LLC, Vineyard, UT (US)

(72) Inventors: Jake E. Entwistle, Vineyard, UT (US); Andre M. Zeitoun, Vineyard, UT (US)

(73) Assignee: Ionic Mineral Technologies, LLC, Vineyard, UT (US)

( * ) Notice: Subject to any disclaimer, the term of this patent is extended or adjusted under 35 U.S.C. 154(b) by 140 days.

(21) Appl. No.: 18/241,068

(22) Filed: Aug. 31, 2023

(65) Prior Publication Data
US 2024/0076192 A1    Mar. 7, 2024

Related U.S. Application Data

(60) Provisional application No. 63/403,654, filed on Sep. 2, 2022.

(51) Int. Cl.
*B01J 2/06*     (2006.01)
*C01B 33/023*   (2006.01)
*C01B 33/12*    (2006.01)

(52) U.S. Cl.
CPC ............ *C01B 33/023* (2013.01); *C01B 33/12* (2013.01); *B01J 2/06* (2013.01); *C01P 2002/72* (2013.01);
(Continued)

(58) Field of Classification Search
CPC .......... C01B 33/023; C01B 33/12; B01J 2/06; C01P 2002/72; C01P 2006/40; C01P 2006/80
(Continued)

(56) References Cited

U.S. PATENT DOCUMENTS

| | | |
|---|---|---|
| 5,080,778 A | 1/1992 | Lambert |
| 2013/0219963 A1 | 8/2013 | Lehmann et al. |
| 2014/0227548 A1 | 8/2014 | Myrick |

FOREIGN PATENT DOCUMENTS

| | | |
|---|---|---|
| CN | 105084366 A | 11/2015 |
| CN | 108358206 B | 8/2018 |

(Continued)

OTHER PUBLICATIONS

International Search Report and Written Opinion dated Jan. 29, 2024 for PCT/US2023/031760.
(Continued)

*Primary Examiner* — Christina A Johnson
*Assistant Examiner* — Xue H Liu
(74) *Attorney, Agent, or Firm* — Foley & Lardner LLP

(57) ABSTRACT

A method of manufacturing porous silicon particles includes providing a rotary tube furnace including a tube extending between a first opening and a second opening opposite the first opening. The method includes providing a silica precursor, a metal reducing agent, and a thermal moderator as a mixture to an interior cavity of the tube through the first opening. The method includes rotating the tube containing the mixture. The method includes performing a thermal treatment to the mixture in the tube to produce a reaction product that includes the porous silicon particles. The method further includes collecting the reaction product at the second opening, where the steps of providing the mixture, rotating the tube, performing the thermal treatment, and collecting the reaction product are performed concurrently such that the porous silicon particles are produced in a continuous manner.

20 Claims, 9 Drawing Sheets

(52) U.S. Cl.
CPC ...... *C01P 2006/40* (2013.01); *C01P 2006/80* (2013.01)

(58) Field of Classification Search
USPC .......................................................... 264/8
See application file for complete search history.

(56) References Cited

FOREIGN PATENT DOCUMENTS

| | | |
|---|---|---|
| KR | 102147727 B1 | 8/2020 |
| WO | WO-2011/042742 A1 | 4/2011 |

OTHER PUBLICATIONS

C. Shen et al., "In Situ and Ex Situ TEM Study of Lithiation Behaviours of Porous Silicon Nanostructures.," Sci Rep, vol. 6, No. Feb. 2016.

Canham, Silicon quantum wire array fabrication by electrochemical and chemical dissolution of wafers, Applied Physics Letters, 57(1), Sep. 3, 1990, 1046-1048.

Dai et al., Bottom-up synthesis of high surface area mesoporous crystalline silicon and evaluation of its hydrogen evolution performance, Nature Communications, DOI:10.1038/ncomms4605, Apr. 10, 2014.

Entwistle et al., Enabling scale-up of mesoporous silicon for lithium-ion batteries: a systematic study of a thermal moderator, Royal Society of Chemistry, RSC Adv., 11, pp. 3801-3807, Oct. 22, 2020, 7 pgs.

Entwistle, J., et al., A review of magnesiothermic reduction of silica to porous silicon for lithium-ion battery applications and beyond, Journal of Materials Chemistry A, vol. 6, No. 38, pp. 18344-18356, Oct. 14, 2018.

Entwistle, J., et al., Mechanistic understanding of pore evolution enables high performance mesoporous silicon production for lithium-ion batteries. Journal of Materials Chemistry A, 8 (9). pp. 4938-4949, (2020), ISSN 2050-7488, 55 pgs.

Larbi et al, Reduction behavior of rice husk ash for preparation of high purity silicon, Canadian Metallurgical Quarterly, Oct. 1, 2011, 50(4):341-9.

X. H. Liu, X. H., et al., Size-dependent fracture of silicon nanoparticles during lithiation, ACS Nano, vol. 6, No. 2, pp. 1522-1531, 2012, Jan. 4, 2012.

Yoo, Jung-Keun, et al., Extremely High Yield Conversion from Low-Cost Sand to High-Capacity Si Electrodes for Li-Ion Batteries, Advanced Energy Materials, (2014), 9 pgs.

Yoon, Naeun, et al., High-Conversion Reduction Synthesis of Porous Silicon for Advanced Lithium Battery Anodes, Elsevier Ltd., Feb. 8, 2021, 12 pgs.

|  | Surface Area (m²/g) | Pore Volume (cm³/g) | Crystallite Size (nm) |
|---|---|---|---|
| Sample | 20.9 | 0.14 | 16 |

FIG. 9A

|  | Surface Area (m²/g) | Pore Volume (cm³/g) | Crystallite Size (nm) |
|---|---|---|---|
| Sample | 136 | 0.78 | 5 |

FIG. 9B

METHODS AND APPARATUS OF PRODUCING SILICON NANOPARTICLES

CROSS-REFERENCE TO RELATED APPLICATIONS

This application claims the benefit of priority under 35 U.S.C. § 119(e) to U.S. Provisional Patent Application 63/403,654 titled "METHODS AND APPARATUS OF PRODUCING SILICON NANOPARTICLES," filed Sep. 2, 2022, which is hereby incorporated herein by reference in its entirety.

FIELD OF DISCLOSURE

The present disclosure is generally related to methods and apparatus of producing nanoparticles and specifically related to manufacturing porous silicon particles.

BACKGROUND

Porous silicon particles (alternatively referred to as "porous silicon nanoparticles," "porous silicon nanostructures," or "porous silicon nanotubes," or more generally as "silicon particles" or "silicon crystallites" in the following disclosure) are a promising anode material for lithium-ion batteries (LIBs) with a theoretical capacity of about 3600 mAh/g, compared to the capacity of the conventional anode material graphite with a theoretical capacity of about 372 mAh/g. The significantly greater capacity of silicon may lead to higher energy density in LIBs. In addition, porous silicon particles have demonstrated other advantages including, for example, fast charging. Furthermore, porous silicon particles may also be utilized in other applications including, for example, hydrogen gas production, fuel cells, drug delivery, catalysis support, electronics, solar power, photoluminescence, photocatalysis, to name a few.

However, during battery operation the reversible lithiation of silicon causes porous silicon particles to undergo repeated volume expansion and contraction. In some instances, such volume expansion may be up to three-times the porous silicon particles' original volume. This is in contrast to an expansion of about 10% its original volume for graphite. The repeated volume expansion and contraction leads to degradation of the silicon material's structure during cycling and decline in its reversible capacity.

Existing implementations for mitigating porous silicon particles' degradation during lithiation in the LIB anode electrode include, for example, reducing the size of porous silicon particles to below a critical threshold and introducing pores in the porous silicon particles. At sizes less than the threshold (e.g., below about 150 nm), porous silicon particles generally do not pulverize upon expansion. Furthermore, a porous silicon particle may expand into its own pore volume, reducing the stress on the particle itself and any surrounding particles.

Current technologies of producing porous silicon particles suitable for LIB applications include, for example, top-down chemical vapor deposition (CVD) of silicon-containing gases (e.g., silane) onto carbon-based materials or other substrates (e.g., copper foil). However, the production of silane gas is currently lacking in scale, which also impacts the scalable production of porous silicon particles to significantly affect industries utilizing such porous silicon particles (e.g., the LIB anode industry). In addition, the top-down CVD process forms porous silicon particles having sizes on the µm—rather than nm—scales, which are above the threshold particle size for porous silicon particles described above. Additionally, the CVD method requires a substrate to fuse silicon into or onto, resulting in a lower capacity silicon composite versus an ability to produce a 100% silicon nano particle with the maximum theoretical capacity.

Other technologies for producing porous silicon particles include using a metallothermic reduction reaction in a top-down synthesis process. This method utilizes nanoscopic silica precursors and converts them into nanoscopic porous silicon particles in a reduction process. If done correctly, this reduction reaction takes place well below the melting point of both silicon and silica, therefore the nanoscopic structure can be maintained. Metallothermic reduction, however, is highly exothermic and therefore specific precautions are routinely taken to avoid a runaway reaction leading to potential destruction of nanoscopic structures and properties of the porous silicon particles. Many studies have implemented such reduction reaction in batch processes. However, such batch processes generally have three main drawbacks. Firstly, existing reaction vessels are generally designed to perform these reduction reactions at small scales (e.g., at a batch size of about 5 g), leading to a lower purity of the porous silicon particles, even though at small scales the overall exothermic energy can be kept low enough that it can be dissipated from the reaction vessels. Secondly, in a batch process, an upper reaction purity of silicon is usually determined by the reaction time, which ranges from one hour to ten hours, with six hours being the usual, lowering the efficiency of the production process. Thirdly, when the purity of the produced porous silicon particles is low, then (HF) acid is required to remove any unreacted precursor materials (e.g., silica) from the porous silicon particles. Any one or more of these factors can reduce the economic viability of the production of the porous silicon particles. Although scaling up the batch processes may address some aspects of these drawbacks, methods of dissipating the exothermic energy released during the metallothermic reduction reaction remains a challenge.

Accordingly, for at least these reasons, improvements in the scalable production of silicon, such as porous silicon particles, are desirable.

SUMMARY OF DISCLOSURE

The present disclosure provides apparatus and methods of producing porous silicon particles.

In one aspect, the present disclosure provides a method of producing nanoparticles. The method can include providing a rotary tube furnace including a tube extending between a first opening and a second opening opposite the first opening. The method can include providing a silica precursor, a metal reducing agent, and a thermal moderator as a mixture to an interior cavity of the tube through the first opening. The method can include rotating the tube containing the mixture. The method can include performing a thermal treatment to the mixture in the tube to produce a reaction product that includes the porous silicon particles. The method can further include collecting the reaction product at the second opening, where the steps of providing the mixture, rotating the tube, performing the thermal treatment, and collecting the reaction product are performed concurrently such that the porous silicon particles are produced in a continuous manner.

In another aspect, the present disclosure provides a method of producing silicon particles. The method can include providing a rotary tube furnace including a tube that extends between a first opening and a second opening opposite the first opening. The method can include receiving a mixture in an interior cavity of the tube through the first opening, the mixture including a silica precursor, a metal reducing agent, and a salt. The method can include rotating the tube containing the mixture. The method can include performing a thermal treatment on the mixture in the tube, resulting in a reaction product that includes the silicon particles. The method can include sintering the silicon particles. The method can further include collecting the sintered silicon particles at the second opening, wherein receiving the mixture, rotating the tube, performing the thermal treatment, and collecting the reaction product are performed in a continuous manner.

In yet another aspect, the present disclosure provides a rotary tube furnace for manufacturing nanoparticles. The rotary tube furnace can include a material inlet configured to receive a reactant. The rotary tube furnace can include a material outlet configured to discharge a product. The rotary tube furnace can include a tube having an interior cavity, the tube extending along a longitudinal axis between a first opening coupled to the material inlet and a second opening coupled to the material outlet. The rotary tube furnace can include a mixing module configured to continuously rotate the tube about the longitudinal axis. The rotary tube furnace can include a heating module configured to heat the interior cavity of the tube to a selected temperature. The rotary tube furnace can include a tilting module coupled to the tube and configured to raise the first opening of the tube relative to the second opening of the tube. The rotary tube furnace can further include a vacuum module coupled to the tube and configured to maintain the interior cavity of the tube at a selected vacuum level.

In still another aspect, the present disclosure provides a porous silicon reaction product produced by a method that can include providing a rotary tube furnace including a tube extending between a first opening and a second opening opposite the first opening. The method can include providing a silica precursor, a metal reducing agent, and a thermal moderator as a mixture to an interior cavity of the tube through the first opening. The method can include rotating the tube containing the mixture. The method can include performing a thermal treatment to the mixture in the tube to produce a reaction product that includes the porous silicon particles. The method can further include collecting the reaction product at the second opening, where the steps of providing the mixture, rotating the tube, performing the thermal treatment, and collecting the reaction product are performed concurrently such that the porous silicon particles are produced in a continuous manner.

The methods of the present disclosure allow the metallothermic reduction of silica to be performed on a continuous basis using an apparatus that includes, for example, an unsealed, rotary furnace. The apparatus is configured to heat and mix reactants of the metallothermic reduction reaction in a continuous manner while providing controlled temperature and atmospheric conditions. Advantageously, the production of porous silicon particles using the presently disclosed apparatus and method has demonstrated higher throughput (e.g., the same or an increased amount of silicon particles generated over a shorter production period) and higher product purity than a batch process, which is widely utilized in existing production of silicon particles. The batch process, in contrast, generally results in incomplete reduction of silica, which subsequently requires use of toxic HF acid as a secondary step to remove the unreacted silicon. Additionally, the presently disclosed apparatus and method can reduce the residence time of the reactants in the rotary furnace to less than one hour, which is significantly less than the one-to-ten-hour (e.g., six hour) periods associated with the typical batch process.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 9A and 9B each illustrate a table showing physical properties of the samples of the porous silicon particles corresponding to the samples of FIGS. 8A and 8B, respectively, in accordance with some embodiments of the present disclosure.

DETAILED DESCRIPTION

Figure 1:
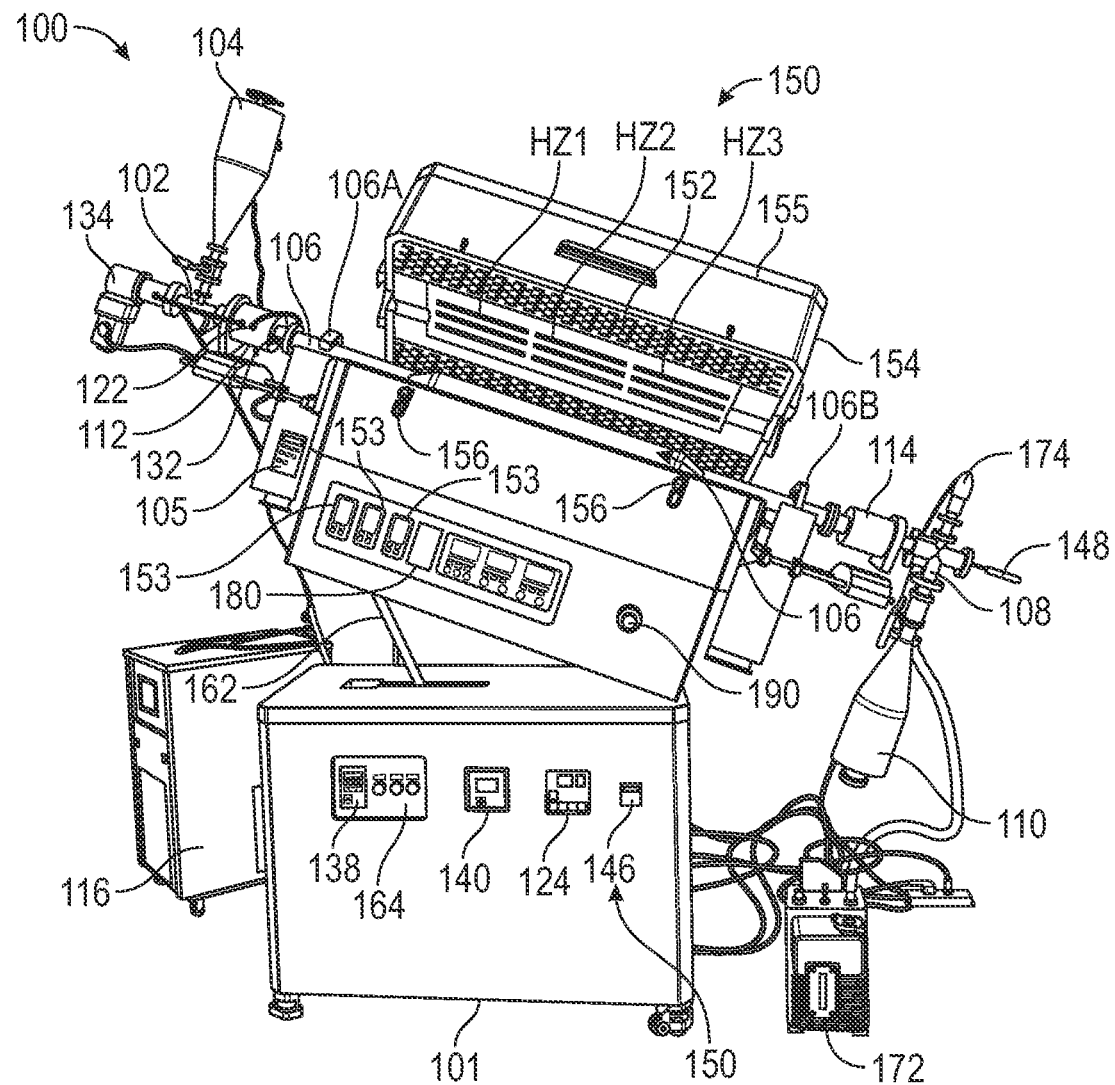
FIGS. 1 and 2 each illustrate a perspective view of an embodiment of an apparatus for manufacturing porous silicon particles, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides apparatuses and methods of manufacturing porous nanoparticles. The apparatuses of the present disclosure are configured to manufacture porous silicon particles. The methods of the present disclosure produce porous silicon particles. In some embodiments, the apparatuses of the present disclosure may perform or otherwise implement the methods disclosed herein. In some embodiments, the methods of the present disclosure represent a scalable way of manufacturing porous silicon particles based on a metallothermic reduction reaction. In some embodiments, the apparatuses of the present disclosure perform the methods in a continuous manner, rather than in a batch-driven (e.g., a batch-by-batch) process, where the apparatuses are configured to continuously sense and control temperature, atmosphere, residence time, and throughput of the production of the porous silicon particles. In some embodiments, the sensing and controlling of the atmosphere, the residence time, and the throughput of the production of the porous silicon particles are implemented independently of one another. In some embodiments, the apparatuses of the present disclosure can be scaled up to industrial sizes (e.g., with greater than about 100-ft length) for a throughput of the porous silicon particles on the scale of 10,000s of metric ton (MT)/Pa, for example.

Figure 2:
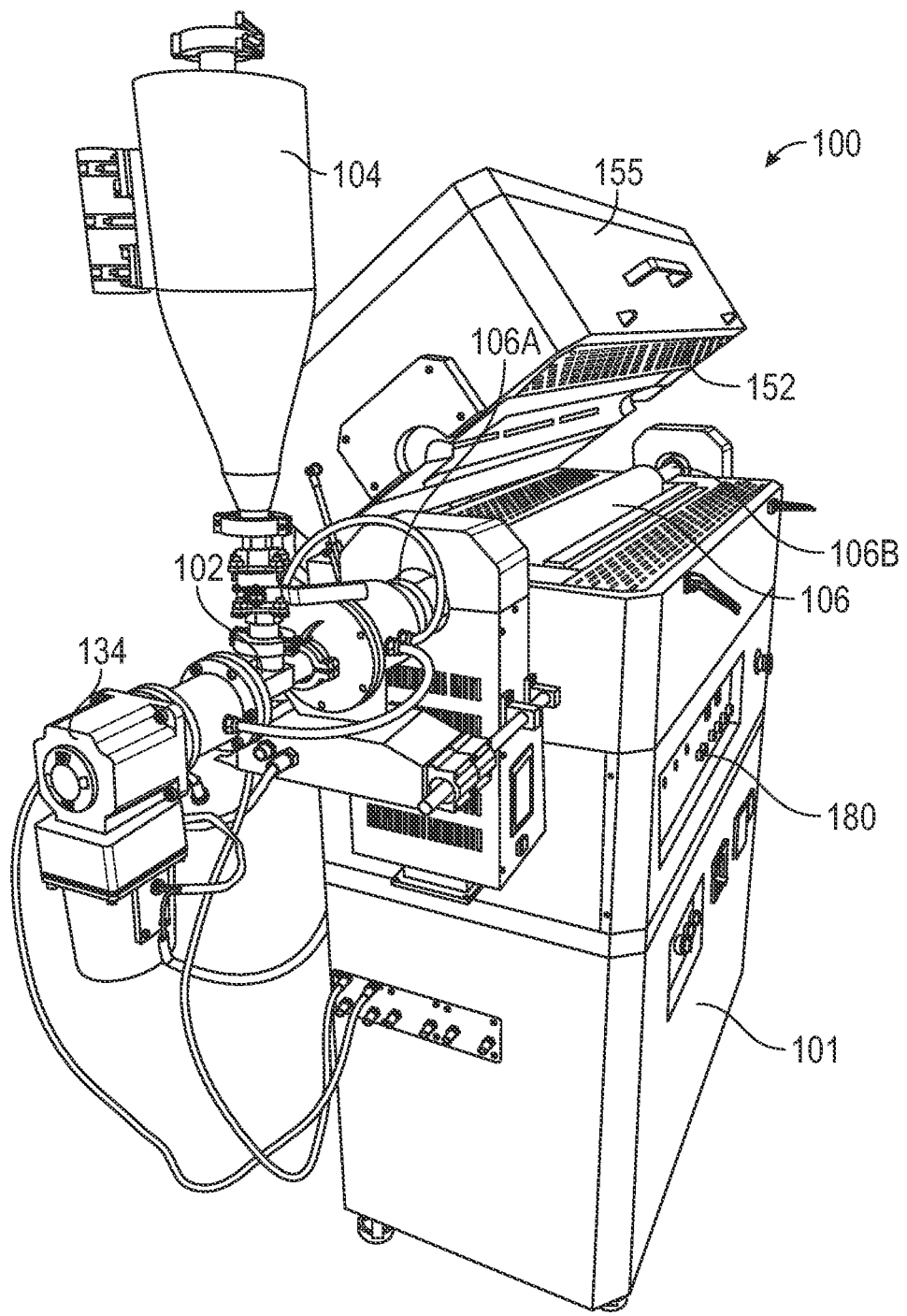

Referring to FIGS. 1 and 2, the present disclosure provides a rotary tube furnace (hereafter referred to as "furnace" for simplicity) 100 configured to manufacturing nanoparticles. Particularly, the present disclosure is directed to the furnace 100 designed to house a metallothermic reaction (alternatively referred to as a "metallothermic reduction reaction," an "exothermic reaction," or a "reduction reaction" in the following disclosure) between a silica precursor and a metal reducing agent (alternatively referred to as "metal reductant" or "metal reactant" in the following disclosure) for producing porous silicon particles. It is noted that FIGS. 1 and 2 collectively depict a non-limiting example embodiment of the furnace 100 from various perspectives. Components of the furnace 100 depicted herein may be omitted or replaced, and additional components may be introduced in accordance with embodiments of the present disclosure. FIG. 1 shows an overview of a frontside of the furnace 100, while FIG. 2 shows the furnace 100 from a perspective sideview.

In the present embodiments, the furnace 100 includes a pedestal 101 to structurally support various components of the furnace 100. The furnace 100 includes a material inlet 102 connected (or coupled) to a tube 106 at a first opening 106A, which is connected to a material outlet 108 at a second opening 106B opposite the first opening 106A. The furnace 100 may further include a reactant feed hopper 104 coupled to the material inlet 102, such that reactants of a reaction stored in the reactant feed hopper 104 may be provided to the tube 106 through the material inlet 102. The furnace 100 may further include a product hopper 110 configured to store products (and byproducts) once the reaction is completed. As will be discussed in detail below, the pedestal 101 is configured to tilt to increase a rate at which the reactants are moved through the tube 106 from the material inlet 102 toward the material outlet 108.

In an example embodiment, the reactants stored in the reactant feed hopper 104 may include the silica precursor and/or the metal reducing agent for the metallothermic reaction to produce the porous silicon particles, which may be the product stored in the product hopper 110. In some instances, a reaction byproduct, such as a metal oxide of the metallothermic reaction, may also be stored in the product hopper 110 before being removed. For embodiments in which the reactants are in solid phase, the reactants may be loaded in the reactant feed hopper 104 and fed through the material inlet 102. In some embodiments, thermal moderators, such as magnesium chloride ($MgCl_2$), sodium chloride (NaCl), and/or other suitable salts, are fed through the material inlet 102 before, during, or after feeding the reactants, as their melting points are below that of silica/silicon, which helps absorb the exothermic energy of the reaction. In some embodiments, the thermal moderators are first dried in an oven at about 110° C. before being fed through the material inlet 102.

In some embodiments, the furnace 100 further includes a feeding speed control 105 coupled to the material inlet 102. In some examples, the feeding speed control 105 is disposed between the material inlet 102 and the first opening 106A of the tube. The feeding speed control 105 is configured to adjust a rate at which the reactants in the reactant feed hopper 104 are fed into the tube 106 through the material inlet 102.

The tube 106 includes an annular wall surrounding an interior cavity, which is configured to contain the reactants received through the material inlet 102. In some embodiments, the tube 106 extends continuously between the first opening 106A and the second opening 106B along a longitudinal axis AA'. In some embodiments, an interface between the material inlet 102 and the first opening 106A of the tube 106 is separated by a magnetic fluid sealing element 112, and an interface between the material outlet 108 and the second opening 106B of the tube 106 is separated by a magnetic fluid sealing element 114, which may be similar to the magnetic fluid sealing element 112. The magnetic fluid sealing elements 112 and 114 are configured to seal the interior cavity of the tube 106, which may be maintained at an elevated temperature and/or reduced pressure, from a surrounding environment. In some embodiments, the furnace 100 further includes a chiller 116 coupled to the magnetic fluid sealing elements 112 and 114, the chiller 116 being configured to provide cooling fluid to keep the magnetic fluid sealing elements 112 and 114 below 25° C. to reduce or prevent thermal damage. The chiller 116 provides cooling by circulating water at about 21° C. continuously through the magnetic fluid sealing elements 112 and 114.

In the present embodiments, still referring to FIGS. 1 and 2, the furnace 100 includes a gas module 120 configured to provide a gas (e.g., an inert gas such as argon (Ar), nitrogen ($N_2$), other suitable gases, or combinations thereof) to the interior cavity of the tube 106 and subsequently monitor the pressure and gas flow rate within the interior cavity. In this regard, the gas module includes at least a gas inlet 122 coupled to the material inlet 102 in fluid connection. In the present disclosure, "fluid connection" may refer to a physical, point-to-point connection between two components. Alternatively, "fluid connection" may refer to two components being connected though a third component (e.g., a segment of a tubing), such that a fluid (e.g., gas or liquid) may be transferred between the two components. The present disclosure does not limit the specific location of the gas inlet 122 so long as it is located between the material inlet 102 and the first opening 106A of the tube 106. The gas module 120 further includes a pressure gauge 124 coupled to the interior cavity of the tube 106 and configured to measure pressure exerted by the gas. In some examples, the pressure gauge 124 may be a Pirani gauge; though other types of pressure-measuring devices may also be applicable. The gas module 120 may further include one or more transmission lines (e.g., tubes; not depicted) coupling the gas inlet 122 to a gas tank (not depicted) as well to a digital gas flow meter (not depicted). In an example embodiment, one or more reactant in gas phase may be fed from a gas tank through the gas inlet 122 and into the interior cavity of the tube 106.

In the present embodiments, the furnace 100 includes a mixing module 130 configured to continuously rotate the tube about the longitudinal axis AA', thereby simultaneously other otherwise concurrently mixing and pushing forward the reactants along a length of the tube 106 between the first opening 106A and the second opening 106B. In some embodiments, the mixing module 130 includes: a screw feeder 132 partially extending into the interior cavity of the tube 106; a motor and bearings 134 coupled to an end of the screw feeder 132 and/or to a segment of the tube 106 and configured to rotate the screw feeder 132 and/or the tube 106; a rotation speed control 138 coupled to the motor and configured to monitor the rotation speed of the motor and bearings 134; and a mass flow readout device 140 coupled to the tube 106 and configured to display calculated (or estimated) mass flow data of the reactant as it travels through the tube 106. In some embodiments, the screw feeder 132 is configured to spiral forward (i.e., rotated) toward the material outlet 108 to transport the reactants from the material inlet 102 into the tube 106. In some examples, the screw feeder 132 may be an auger screw. In some embodiments, the mixing module 130 further includes a chiller 142 coupled to the motor and bearings 134 and configured to provide cooling against overheating.

In the present embodiments, the furnace 100 includes a heating module 150 coupled to the tube 106. In some embodiments, the heating module 150 includes one or more heating elements 152 configured to surround the tube 106 so as to provide heating from various positions around the tube 106. The heating elements 152 may emit heat by any suitable method, such as by resistive heating, conduction heating, IR heating, combustion heating, other heating methods, or combinations thereof. The heating module 150 further includes a temperature gauge 146 coupled to the tube 106 and configured to monitor a temperature within or near the tube 106. The temperature gauge 146 may be any suitable device, such as a K-type thermocouple. In some embodiments, the heating elements 152 are configured to heat the tube 106 to a selected temperature (or several temperatures over a range of temperatures), which can be monitored using the temperature gauge 146.

In some embodiments, as depicted in FIG. 1, the heating elements 152 includes a first heating zone HZ1, a second heating zone HZ2, and a third heating zone HZ3, arranged in this order along a length of the tube 106 between the first opening 106A and the second opening 106B. The heating zones HZ1-HZ3 may be programmed independently by a controller 153, which may be coupled to a control panel 180 (described in detail below), to provide different thermal treatments to different portions of the interior cavity of the tube 106. In some embodiments, the heating zones HZ1-HZ3 correspond to portions of the interior cavity of the tube 106 with different temperatures. For example, a first portion of the tube 106 corresponding to the first heating zone HZ1 has a first temperature T1, a second portion of the tube 106 corresponding to the second heating zone HZ2 has a second temperature T2, and a third portion of the tube 106 corresponding to the third heating zone HZ3 has a third temperature T3, where $T1<T2<T3$. In some embodiments, the temperatures T1-T3 are programmed according to the different thermal treatments applied to a mixture of the reactants of the reduction reaction. In this regard, the mixture of reactants can be continuously mobilized through different portions of the tube 106 to receive different thermal treatments without repeatedly adjusting (e.g., repeated temperature ramping and cooling) the heating elements 152 and/or halting the production process. As a result, the overall throughput of the production process may be improved. In some embodiments, the heating zones HZ1-HZ3 are programmed to the same temperature in the interior cavity of the tube 106.

The furnace 100 may further include a slide sealing element 148 configured to seal the temperature gauge 146 (e.g., a thermocouple) in place, allowing the temperature gauge 146 to measure the temperature within the interior cavity of the tube 106 in-situ during the reduction reaction.

In the present embodiments, the furnace 100 further includes an insulating chamber 154 encasing the heating elements 152 and the tube 106, where the insulating chamber 154 is configured to isolate the tube 106 held at the selected temperature from the temperature in the surrounding environment (e.g., outside the insulating chamber 154). In some embodiments, the insulating chamber 154 includes a chamber door 155 that can be fastened to a body of the insulating chamber 154 by one or more locks 156. Such locks may provide improved sealing of the chamber door 155 for enhanced insulation.

In the present embodiments, the furnace 100 includes a tilting module 160 that includes a tilting element 162 attaching the body of the insulating chamber 154 to the pedestal 101 and a tilting control 164 coupled to the tilting element 162. The tilting element 162 is configured to extend and retract in response to an instruction received from the tilting control 164 and determined by a user. The tilting element 162 may be driven by an actuator or other suitable mechanical means. In the present embodiments, the body of the insulating chamber 154 is coupled to the pedestal 101 to allow the insulating chamber 154 be tilted as shown. For example, attachment points between the pedestal 101 and the body of the insulating chamber 154 serve as pivotal points about which the insulating chamber 154 is tilted. By extending the tilting element 162, a first end of the tube 106 coupled to the material inlet 102 is raised or elevated relative to a second end of the tube 106 coupled to the material outlet 108, causing material(s) in the interior cavity of the tube 106 to be moved toward the material outlet 108. This, coupled with the motor-driven rotation of the tube 106, contributes to a lowered residence time of reactants within the tube 106 and encourages higher throughput for the overall reaction. FIG. 1 depicts the furnace 100 with the tilting element 162 extended and FIG. 2 depicts the furnace 100 with the tilting element 162 retracted.

In the present embodiments, the furnace 100 further includes a vacuum module 170 having a vacuum pump 172 coupled to the tube 106 and a vacuum gauge 174 configured to measure a level of vacuum (i.e., pressure) in the interior space of the tube 106. The vacuum pump 172 may be any suitable pump, such as a mechanical pump or a diffusion pump, in fluid connection with the tube 106. In some examples, the vacuum gauge 174 may be disposed over the material outlet 108 as shown.

Furthermore, as shown in FIGS. 1 and 2, the furnace 100 may include a control panel 180 configured to receive instructions from a user and implement the received instructions by controlling one or more of the mixing module 130, the heating module 150, the tilting module 160, and the vacuum module 170. The furnace 100 may further include a display module (not depicted) coupled to the control panel 180 and configured output operation data related to one or more of the mixing module 130, the heating module 150, the tilting module 160, and the vacuum module 170. In some embodiments, each of the feeding speed control 105 and the rotation speed control 138 may include a control module and a display module for adjusting and monitoring their respective operations. Still further, the furnace 100 may include an emergency stop 190 that is configured to halt the operation of the furnace 100 when switched to an "on" position.

In some embodiments, the furnace 100 may be powered electrically, by combustion, by microwave, or other suitable source(s).

As discussed in detail above, the present disclosure provides a scalable method of manufacturing porous silicon particles based on a metallothermic reduction reaction. Advantageously, the apparatus (i.e., the furnace 100) provided herein performs the method in a continuous manner to improve the throughput of the production of the porous silicon particles. In one example, a mixture of reactants (e.g., a batch size) weighing about 700 g is passed through the tube 106 in a period of an hour, where the mixture includes a metal reducing agent (e.g., Mg), a silica precursor (e.g., $SiO_2$), and a thermal moderator (e.g., NaCl). The mixture is heated from room temperature through a set temperature profile with a residence time (or reaction time) of about 15 minutes at about 750° C. (suitable for initiating the metallothermic reduction reaction) before being taken out of the tube 106. An amount of the resulting porous silicon particles collected weighs about 30 g. Compared to the size of this continuous reaction of about 700 g, the existing small-scaled batch processes are generally implemented with batch sizes that do not exceed about 5 g, such as about 1 g to about 3 g. In this regard, to achieve a similar purity of the porous silicon particles using an existing small-scaled batch process, the reaction time may be on the scale of hours, such as about one hour to ten hours, which is significantly longer than the 15 minutes accomplished by the continuous process disclosed herein. It is noted that the furnace 100 can be scaled up (or down) according to an amount of the porous silicon particles desired. For example, the furnace 100 can be configured to process more than 700 g of reactants (and thermal moderator) by enlarging a diameter and/or length of the tube 106. Configurations of other components of the furnace 100 may also be adjusted accordingly.

In addition, the metallothermic reduction reaction implemented by the furnace 100 allows particles of the reactants and the thermal moderator to continuously mix and react with one another, leading to a more thorough reaction and a higher purity of the silicon product (i.e., porous silicon particles) compared to those obtained by a batch process. Accordingly, the amount of any unreacted silicon precursor is reduced or minimized, obviating the need for the removal process involving corrosive acids, such as HF.

Figure 3:
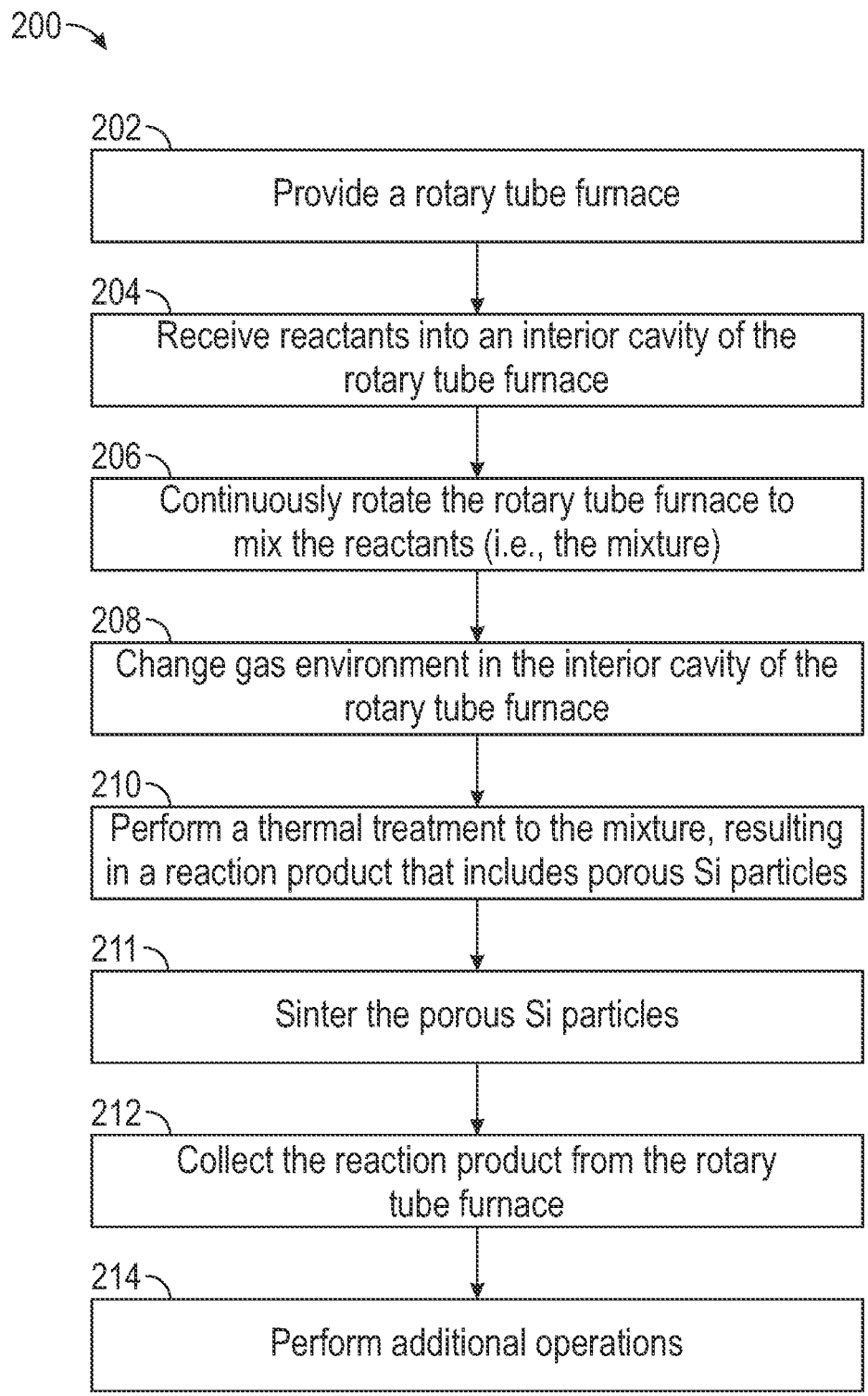
FIG. 3 is a flow diagram illustrating a method of manufacturing porous silicon particles, in accordance with some embodiments of the present disclosure.

FIG. 3 is a flow diagram depicting an embodiment of a method 200 of producing porous silicon particles, according to some embodiments of the present disclosure. The method 200 may, in some embodiments, be performed in/by or otherwise using an embodiment of the furnace 100 discussed in detail above. The method 200 may also be performed with other embodiments of furnaces. The method 200 is merely an example, and is not intended to limit the present disclosure. Accordingly, it should be understood that additional operations may be provided before, during, and after the method 200 of FIG. 3.

At operation 202, the method 200 may include providing a furnace, an example of which is depicted as the furnace 100 in FIGS. 1 and 2 and discussed in detail above.

At operation 204, the method 200 receives (or is provided with) a mixture of reactants (alternatively referred to as a "mixture" or "reactants") including, for example, a silica ($SiO_2$) precursor and a metal reducing agent, as well as any thermal moderator, into the interior cavity of the tube 106 through the material inlet 102. The mixture may first be stored in the reactant feed hopper 104 and fed through the material inlet 102 at a rate controlled by the feeding speed control 105. In some embodiments, the reactant feed hopper 104 may be evacuated, e.g., through its top opening, using a vacuum pump, and may also be heated with a jacket to completely degas and remove any residual water from the reactants before passing them into the tube 106. In the present embodiments, the silica precursor and the metal reducing agent are mixed and subsequently processed in the furnace 100 to form porous silicon particles.

In some embodiments, the silica precursor may be obtained from a halloysite, which is a naturally occurring aluminosilicate with the chemical formula $Si_2Al_2O_5(OH)_4$. The halloysite may include aluminosilicate in a nanotube structure. The silica precursor may be obtained from the halloysite through a series of operations of a purification process. In the present embodiments, a sample of halloysite feedstock is dehydrated, removing any structural water, and dealuminated, removing alumina ($Al_2O_3$), to produce a pure, or substantially pure, sample of silica nanotubes. In some examples, the dealuminated halloysite may subsequently be dried in an oven at about 110° C. The halloysite feedstock from which the silica precursor is derived may be in the form of small-sized pieces obtained directly from a halloysite mining location. Silica precursor derived from other sources, naturally occurring or synthetic, may also be applicable in the present embodiments. In some instances, the removed alumina may be captured and resold as a critical mineral for a variety of applications. In some examples, the halloysite feedstock may include about 50 weight % (wt %) $AlO_3$ and about 50 wt % $SiO_2$, and after performing the dealumination, the amount of $Al_2O_3$ may be reduced to less than about 50 wt %. In further examples, the amount of $Al_2O_3$ may be reduced to about 5 wt % to about 15%, such as about 10 wt %.

Advantageously, the silica nanotubes obtained from halloysite are generally porous and such porous structure may be maintained during the subsequent metallothermic reaction, producing porous silicon particles suitable for various applications. In some embodiments, the dealumination process is carried out to varying degrees, such that the portion of the alumina remaining in the silica precursor may be controlled. In other words, the silica precursor obtained from halloysite may also include aluminum in the form of alumina.

In some instances, byproducts of the dealumination process may be used for specialist applications and improves the economical values of the overall manufacturing process. By controlling various aspects of the dealumination process, such as acid used, temperature, pressure, etc., properties of the halloysite may be adjusted, which then may affect the final product properties, surface area, porosity, morphology of the resulting porous silicon particles.

In some embodiments, the silica precursor obtained from the halloysite is spray-dried to increase its bulk density, which in turn increases the throughput and efficiency of the subsequent metallothermic reaction in the furnace 100. In some embodiments, the silica precursor derived from halloysite has a particle size ranging from about 50 nm in diameter and about 500 nm to about 1 μm in length (e.g., less than about 400 mesh in particle size) to about 6 mm (e.g., about 3 mesh in particle size). In some embodiments, the silica precursor has a particle size ranging from 10 nm to about 44 μm (e.g., about 325 mesh). In some embodiments, the particle size of the silica precursor is generally maintained in, or at least correlated with, the resulting porous silicon particles. In this regard, the particle size of the porous silicon particles can be controlled by adjusting the particle size and shape of the silica precursor. A specific particle size of the silica precursor may be controlled during the dehydration (e.g., spray-drying) and/or the dealumination processes to improve throughput. The drying of the dealuminated halloysite is not limited to spray drying and may include any suitable bulk powder drying process.

In some instances, the halloysite may contain small amounts of iron oxide that may be removed through an aqueous leaching process. According to some embodiments, iron oxide that remains after the metallothermic reduction may be facilely removed due to the drastic changes in the halloysite's chemistry.

In the present embodiments, the metal reducing agent includes magnesium (Mg), aluminum (Al), or a combination thereof. The metal reducing agent may additionally or alternatively include zinc (Zn), lithium (Li), sodium (Na), potassium (K), other suitable metals, or combinations thereof. For purposes of illustration, the present discussion of the metallothermic reaction utilizes Mg as the metal reducing agent. In the present embodiments, the metal reducing agent is utilized in a powdered form.

In some embodiments, the metal reducing agent, such as Mg, may be provided as Mg vapor in the gas phase from more cost-effective forms of Mg metal (ingots). The benefits of this may include an increase in the capacity of the furnace 100 as only the silica precursor is provided in the solid phase. Advantageously, reacting the metal reducing agent in the vapor phase may be beneficial for maintaining the silica precursor's morphology during the reduction reaction, which may also help preserve the nanostructures of the resulting silicon product. In some embodiments, the metal reactant is provided as a powder. For example, Mg can be provided as a powder having a particle size ranging from about 300 mesh (e.g., about 50 μm) to about 6 mesh (e.g., about 3 mm).

If the particle size of the metal reducing agent (e.g., Mg) is too large (e.g., larger than about 3 mm or 6 mesh), then the metal reducing agent may have a lower surface-area-to-volume ratio. In one example, during a reduction reaction that utilizes Mg as the metal reducing agent, a Mg-containing gas is produced from the Mg powders' surface and subsequently reacts with the silica precursor. Therefore, larger Mg particles may lead to slower reduction reaction and, accordingly, a longer reaction time is needed. For example, a reduction reaction utilizing Mg particles with a size greater than about 6 mesh in size (e.g., about 3-mm) may take about six to eight hours to complete without adjusting other parameters, such as pressure. In contrast, Mg particles with a 300 mesh size (or less) may lead to a 15-minute reaction time, thereby significantly improving the throughput of the production of porous silicon particles.

In some embodiments, by controlling one or more of the parameters provided herein, the metal reducing agent can also be provided in particle sizes larger than 6 mesh. In some embodiments, one or more parameters of the metallothermic reduction process, such as reaction time, application of the thermal moderator, reaction temperature, and reaction pressure, can be adjusted (or tailored) according to a given particle size (or range of sizes) of one or more of the metal reducing agent and the thermal moderator, thereby allowing the production process to be more economic and versatile. For example, applying negative pressure in the tube 106 may increase the rate of vaporization for larger Mg particles, thereby improving the reaction time compared to instances when no negative pressure was applied. On the other hand, when smaller Mg particles of a 300 mesh size (or less) are used, the reaction time can be reduced to about 15 min without applying any pressure in the tube 106.

In some embodiments, thermal moderators, such as $MgCl_2$ and NaCl, are provided to the furnace 100 along with the silica precursor and the metal reducing agent as their melting points are below that of silica/silicon, which helps absorb any excess exothermic energy of the reaction. For example, NaCl melts at about 801° C. Other suitable salts capable of providing sufficient latent heat energy of fusion (i.e., energy released during its melting process) to the reduction reaction can also be used as thermal moderators for the present embodiments.

In some embodiments, the thermal moderator (e.g., salt) has a particle size ranging from about 325 mesh (e.g., about 44 μm) to about 80 mesh (e.g., about 177 μm). In some embodiments, the particle size of the thermal moderator is less than about 325 mesh. If the particle size of the thermal moderator is too large (e.g., larger than about 177 μm or 80 mesh), then a surface area and a packing density of the salt particles are reduced in the mixture of the reactants (or feed mixture), which may limit the absorption of heat during the reduction reaction and result in a large spike in the temperature profile (described in detail below). If the particle size of the thermal moderator is too small (e.g., less than about 44 μm or 325 mesh), then a bulk density of the feed mixture is lower and the finer salt particles may remain between the silica particles and the Mg particles, which reduces the reaction rate and increases the residence time of the feed mixture in the furnace 100.

In some embodiments, the particle size of one or more of the metal reducing agent, the thermal moderator, and the silica precursor is adjusted to control aspects of the metallothermic reaction (described in detail below). For example, the thermal moderator may include a distribution of different particle sizes, where the relative amounts of different particle sizes are configured according to a desired temperature profile for heating the mixture of reactants in the furnace 100. In some embodiments, an amount of the thermal moderator particles having a smaller particle size is less than an amount of the thermal moderator particles having a larger particle size. For example, the thermal moderator may include a first amount of the particles having a size of about 325 mesh, a second amount of the particles having a size greater than about 325 mesh but less than about 80 mesh, and a third amount of the particles having a size of about 80 mesh, where the first amount is less than the second amount and the second amount is less than the third amount.

The metallothermic reduction discussed herein is generally performed at relatively low temperatures, for example, at about 500° C. to about 900° C., as this range of temperature is below the melting point of silicon, which is about 1414° C., and the silica precursor, which is about 1600° C., and may be favorable for maintaining the morphology (e.g., shape) of the silica precursor in the silicon product form after the reaction is completed.

A chemical equation of the metallothermic reduction of silica to produce silicon and magnesium oxide (MgO) is shown below as Scheme I. The reaction is typically done under an inert atmosphere, such as Ar, $N_2$, or vacuum. Analogously, other metals, including Al, may also be used as the reductant to form silicon and alumina, for example.

$$SiO_2 + 2Mg \rightarrow Si + 2MgO \quad (I)$$

Because the metallothermic reduction reaction is generally highly exothermic (i.e., generating heat during reaction), the released thermal energy can increase local temperatures (in or near the reactants) to above the melting points of silica/silicon, potentially damaging the nanostructures of the resulting silicon product (e.g., porous silicon particles). For at least this reason, existing production of silicon based on silica reduction has relied on very small batch scale reactors to control this such generation. In the present disclosure, factors including the rotation of the tube 106, the pressure applied within the tube 106, the rate of mass flow of the inert gas within the tube 106, the throughput of the reactants (e.g., the silica precursor, the metal reducing agent, and/or the thermal moderator), and the continuous mixing of reactants in the tube 106 can help dissipate the excessive heat generated by the reduction reaction. By controlling the excessive heat of the reduction reaction, production of high-purity porous silicon particles can be achieved within relatively shorter reaction time, such as about 15 minutes. In some embodiments, the control of the temperature, pressure, and constant mixing of the reactants allows for a controlled synthesis of porous silicon particles. In some embodiments, the control of a temperature spike achieved during the reduction reaction (as discussed in detail below) improves the purity of the resulting porous silicon particles to greater than about 80% within relatively shorter reaction time.

Figure 5:
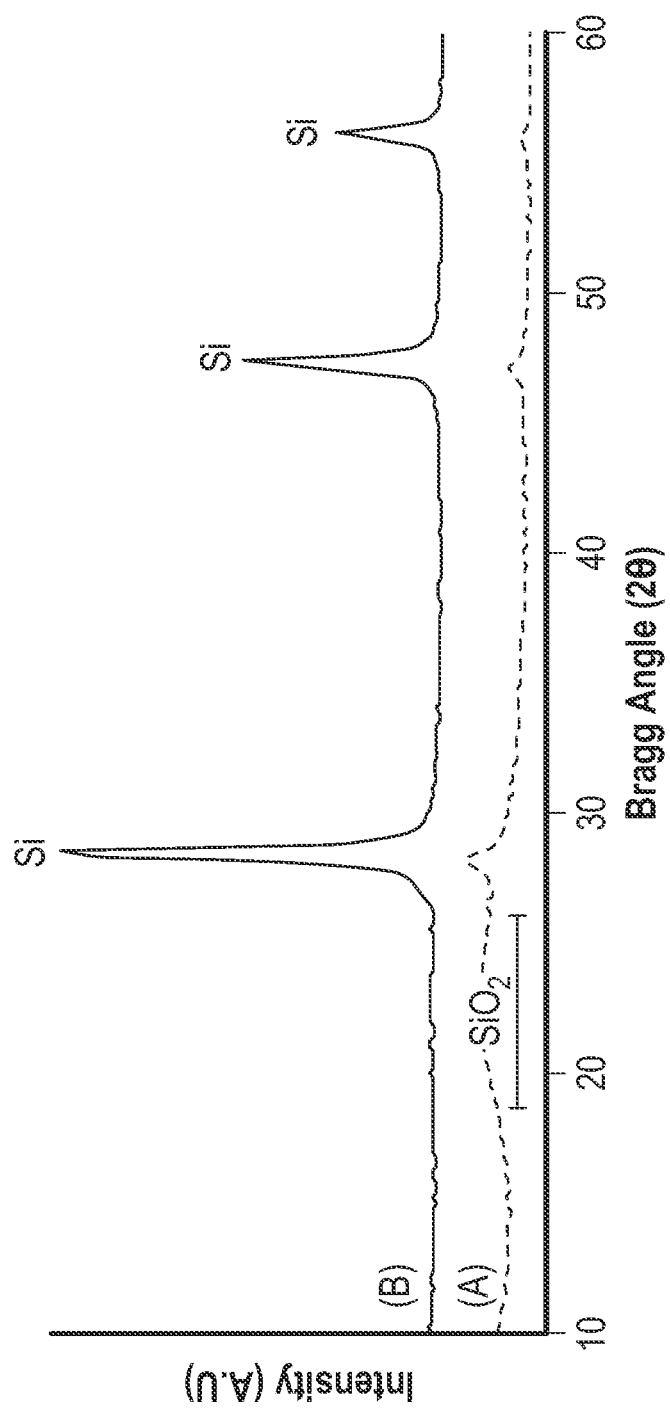
FIG. 5 illustrates a plot comparing X-ray diffraction spectra of porous silicon particles produced by a batch process (spectrum A) and a continuous process (spectrum B), in accordance with some embodiments of the present disclosure.

For example, FIG. 5 compares an X-ray diffraction (XRD) spectrum A corresponding to a sample of porous silicon particles produced by a static, batch process in a muffle furnace to a spectrum B corresponding to a sample of porous silicon particles produced by the disclosed continuous process in the furnace 100 described herein. Both samples have the same parameters, including a molar ratio of the metal reducing agent (e.g., an amount of the metal reducing agent to an amount of the silica precursor, which may be about 2.07:1), a weight ratio of the thermal moderator (e.g., an amount of the thermal moderator to an amount of the silica precursor, which may be about 4:1), an upper reaction temperature (e.g., about 750° C.), and a reaction (or residence) time of about 15 minutes.

A comparison of spectra A and B shows that the intensity of each silicon peak is significantly higher for the sample produced by the continuous process than that of the sample produced by the batch process, indicating that the purity of the porous silicon particles present in the sample produced by the continuous process is greater than that produced by the batch process. In addition, a broad peak in spectrum A but absent in spectrum B also suggests the presence of unreacted silica precursor remaining in the sample produced by the batch process but not present in the sample produced by the continuous process. For the sample corresponding to spectrum A, an acid bath containing HF and/or other acids must be used to selectively remove any unreacted silica from the lower yield of silicon produced by the batch process. This significantly affects the cost of the process. Firstly, HF is an expensive and extremely toxic acid and its scalability on a bulk synthesis process is unproven. Secondly. the lower yield of silicon after HF acid bath will increase the cost of production due to longer reaction times and wasted reactants (e.g., wasted metal reductant and silica precursor feedstock). In some examples, the sample produced by the batch process can be converted to obtain silicon particles with higher purity via a reaction according to, for example, Schemes II and III described in detail below. However, in this case, the metal reducing agent, such as Mg, and the silica precursor are wasted, raising the cost of the production process. In addition, an acid bath involving HF may still be necessary to obtain the porous silicon particles after the conversion process.

In contrast, due to its relatively higher purity of silicon, the sample corresponding to spectrum B does not need to undergo washing with the acid bath, thereby reducing the cost of production and avoiding any use of corrosive acids, such as HF. In some embodiments, the purity of silicon in the sample corresponding to spectrum B ranges from about 75% to about 80%, while the purity for silicon in the sample corresponding to spectrum A ranges from about 10% to about 15%. Although the purity of the sample produced by the batch process can be higher than 15%, the reaction time required to achieve such a level of purity would be much longer than the continuous process. For example, the batch process may require hours, such as six hours, to achieve a similar level of purity as the continuous process disclosed herein.

In some embodiments, the mixture containing the silica precursor, the metal reducing agent, and the thermal moderator, all provided in powdered form, for example, is first homogenized in a blending process to be thoroughly combined, where sizes of grains of the salt (e.g., the thermal moderator) are also reduced. In one such example, the salt may be ground from a table salt (e.g., NaCl) grade to a much finer size.

In some embodiments, a molar ratio of an amount of the metal reducing agent (e.g., Mg) to an amount of the silica precursor (e.g., dealuminated halloysite) is about 1.5 to about 2.5, such as about 2.07:1. In some embodiments, a weight ratio of an amount of the thermal moderator (e.g., NaCl) to a an amount of the silica precursor (e.g., dealuminated halloysite) and the metal reactant (e.g., Mg) may be less than about 5:1, such as about 4:1. In one such example, 1 g of the dealuminated halloysite may be mixed with 7.4 g of NaCl and 0.85 g of Mg with a particle size not exceeding 300 mesh. In some examples, the mixture may be free from any thermal moderator.

In some embodiments, a temperature at which the exothermic reaction occurs according to Scheme 1 is governed by factors including the weight ratio of the amount and chemistry (or type) of the thermal moderator to the combined amount of the silica precursor and the metal reducing agent, the molar ratio of the metal reducing agent to the silica precursor, the size of the grains of the salt, or combinations thereof. For example, if the ratio of the amount of the thermal moderator to the amount of the silica precursor decreases, then the exothermic reaction can lead to a larger "spike" (as described in detail below). If a different salt is used, i.e., the chemistry of the thermal moderator is changed, the moderation of thermal energy during the exothermic reaction can be changed accordingly based on the latent heat of fusion of the salt. In some embodiments, any salt capable of controlling the thermal energy released during the exothermal reaction to not adversely affect the nanostructure of the porous silicon particles is applicable.

As will be discussed in detail below, the present disclosure provides a method of forming porous silicon particles based on the metallothermic (e.g., exothermic) reduction of silica, which can be implemented in the furnace 100 provided herein. Advantageously, the furnace 100, and the method of using it, offers a scalable, bottom-up synthesis route to produce porous silicon particles having a porous structure. In the present embodiments, such scalable process may utilize reactants (e.g., silica derived from halloysite) that are available on much larger scales (e.g., metric ton) suitable for a variety of industries, such as the LIB anode industry. Furthermore, the furnace 100 and the method of using the same provided herein can directly lead to scalable production not impacted, or substantially impacted, by challenges faced by small, batch-driven processes in exiting technologies (e.g., the top-down CVD of silane gases and small-scaled batch reactions of the metallothermic reduction according to Scheme I).

At operation 206, the method 200 continuously rotates the tube 106 to mix the reactants including the silica precursor, the metal reducing agent, and the thermal moderator (if included), which are collectively referred to as the "mixture" hereafter. In the present embodiments, the continuous rotation of the tube 106 is implemented by the mixing module 130.

At operation 208, the method 200 changes the gas environment in the interior cavity of the tube 106. In some embodiments, operation 208 applies a negative pressure to the tube 106, a process implemented by the vacuum module 170. In some embodiments, the operation 208 fills the interior cavity of the tube 106 with an inert gas, such as Ar or $N_2$, at a pressure similar to the atmospheric pressure, which is at about 1 atm.

In some embodiments, the gas environment in the interior cavity of the tube 106 is established by first flowing an inert gas through the tube 106 for about 30 minutes to replace or purge the ambient atmosphere inside. Such purging may be repeated three times to establish the inert gas environment. Once the inert gas environment is reached, a flow rate of the inert gas applied to maintain the pressure within the tube 106 may be about 175 mL/min, for example.

At operation 210, the method 200 performs a thermal treatment to the mixture. In the present embodiments, the thermal treatment of the mixture in the tube 106 is implemented and monitored by the heating module 150.

Figure 4:
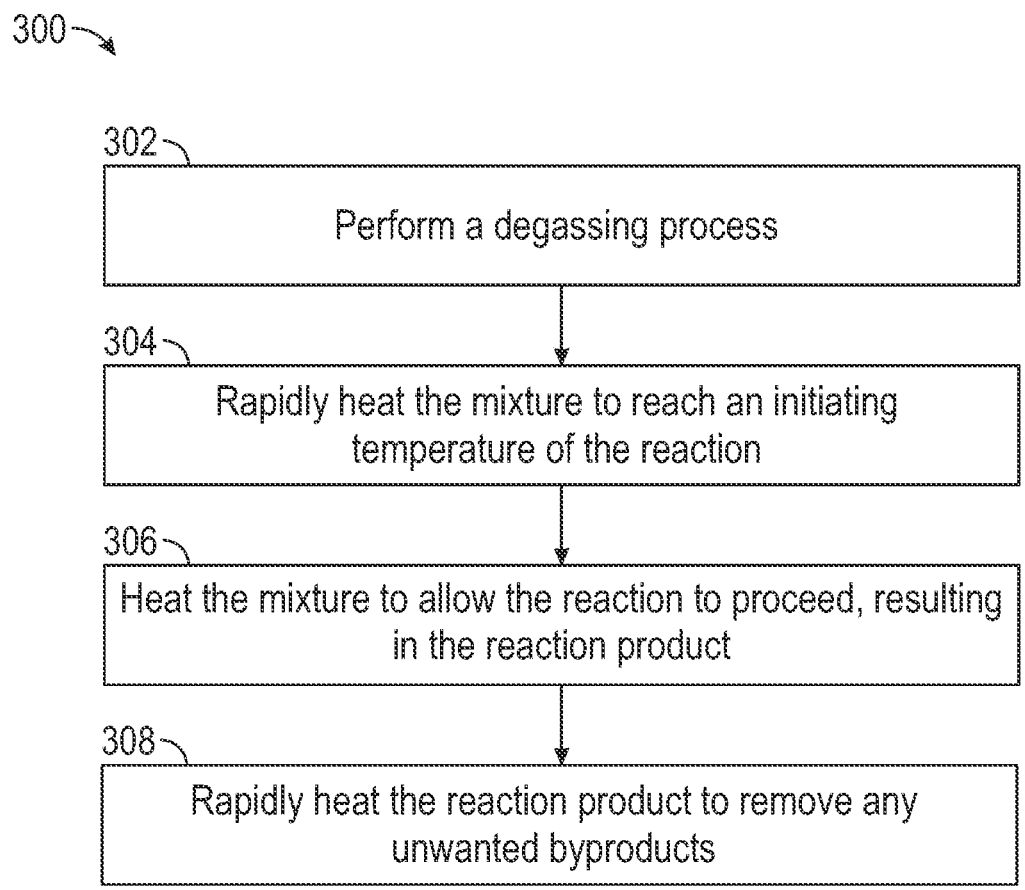
FIG. 4 is a flow diagram illustrating a method of performing a thermal treatment in manufacturing porous silicon particles, in accordance with some embodiments of the present disclosure.

In some embodiments, referring to FIG. 4, thermally treating the mixture is implemented in the furnace 100 according to a method 300. The method 300 is merely an example, and is not intended to limit the present disclosure. In this regard, it should be understood that additional operations may be provided before, during, and after the method 300 of FIG. 4. Intermediate stages of the thermal treatment described by the method 300 may be further illustrated by plot 400 of FIG. 6, which includes profiles 402, 404, and 406 each depicting changes in temperature over time. The profiles 402 and 404 correspond to mixtures having the same compositions, while the profile 406 corresponds to a mixture having Mg with particle sizes larger than the Mg in the mixtures that correspond to the profiles 402 and 404.

At operation 302, the method 300 performs a degassing process by heating the mixture to a temperature that is less than an initiating temperature at which the exothermic (e.g., the metallothermic) reaction occurs according to Scheme I. In some embodiments, the degassing temperature is less than half of the initiating temperature. In some examples, the degassing temperature may be less than about 200° C., such as about 160° C., and may be held at such temperature for about 30 minutes.

Figure 6:
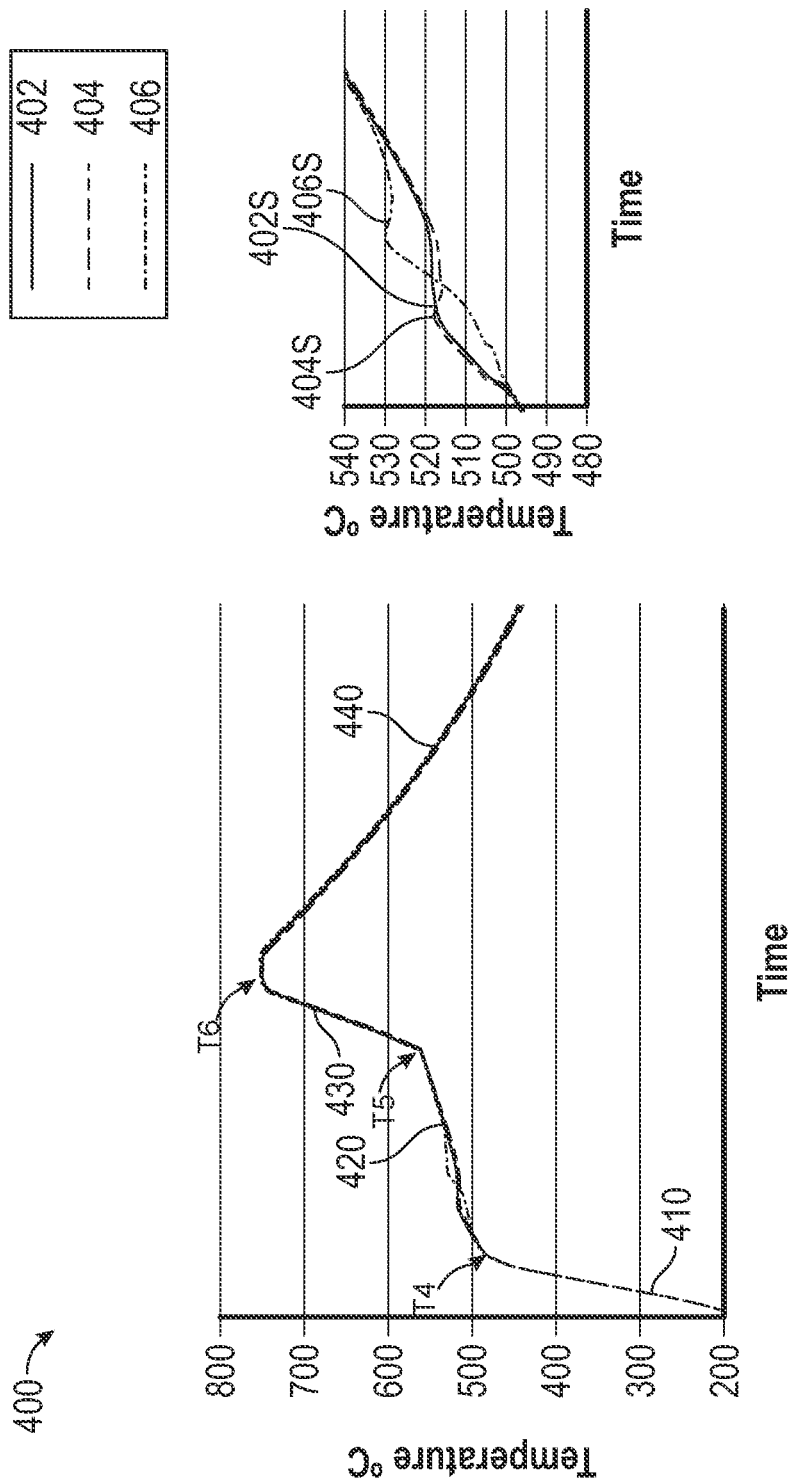
FIG. 6 illustrates a plot showing example temperature profiles during intermediate stages of the method(s) illustrated in FIGS. 3 and 4, in accordance with some embodiments of the present disclosure.

At operation 304, the method 300 rapidly heats the mixture to reach the initiating temperature T4, which may be about 500° C., and the mixture may be held at this temperature for about 30 minutes according to some examples. The initiating temperature is a temperature under which the exothermic reaction does not, or does not substantially, occur. Referring to FIG. 6, the heating at the operation 304 is indicated by segment 410 in each of the profiles 402-406. The rapidity of the heating implemented at the operation 304 is represented by a relatively steeper slope of the segment 410 in comparison to other segments in each of the profiles 402-406.

At operation 306, the method 300 heats the mixture at a rate of about 1° C./min over a range of temperatures, such as from about 500° C. to a reaction temperature T5 of about 560° C., within which the exothermic reaction occurs. The heating of the mixture implemented at the operation 306 is represented by segment 420 in each of the profiles 402-406 in FIG. 6.

In some embodiments, as shown in an enlarged view of the plot 400, portions 402S, 404S, and 406S of the profiles 402-406, respectively, are described as slight humps, indicating a small rise in temperature over the initiating temperature of about 500° C., such as in a range of about 515° C. to about 530° C., as the exothermic reaction occurs. Such a rise in temperature can extend over a period of about one to two minutes.

Figure 7:
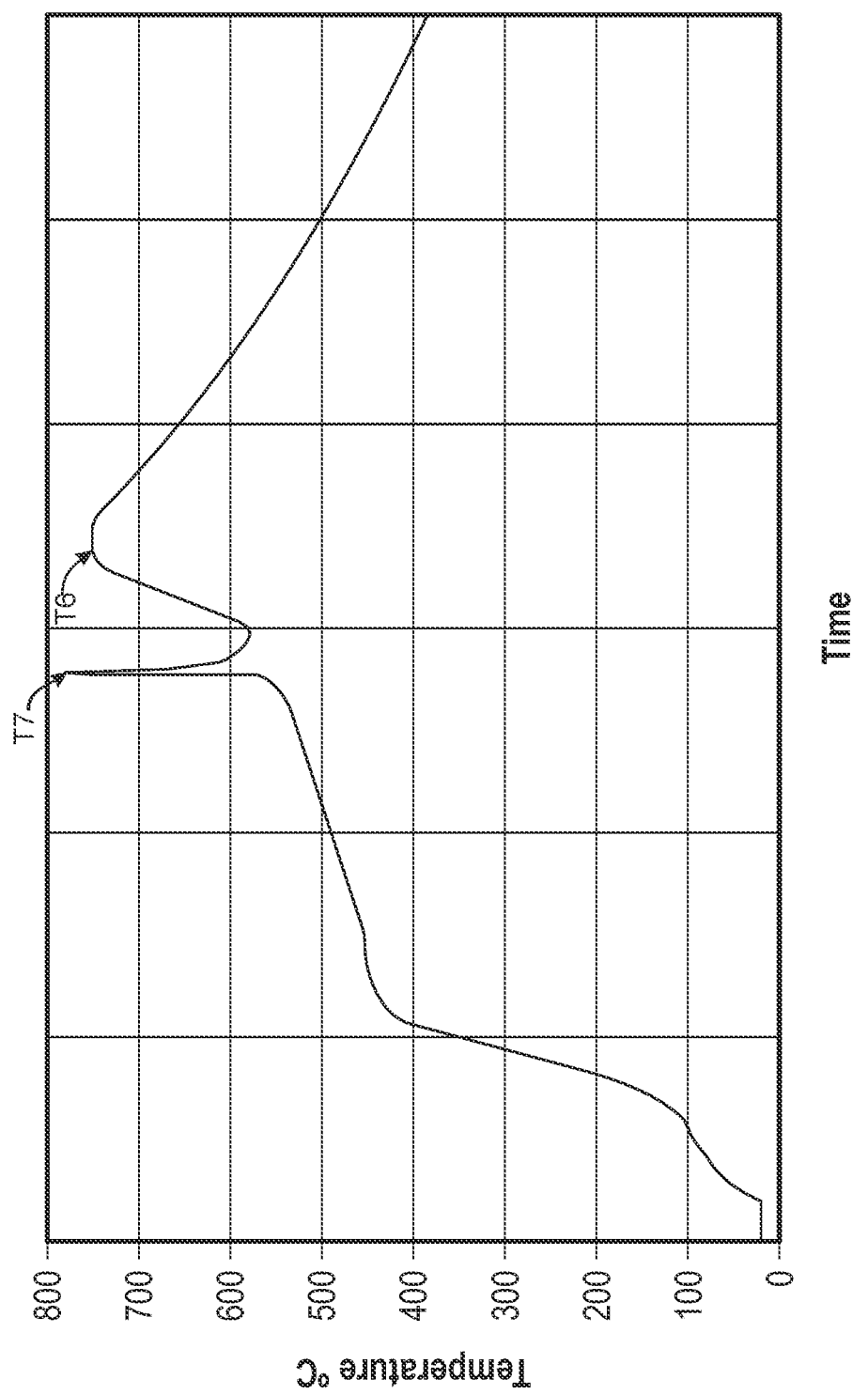
FIG. 7 illustrates a plot showing an example temperature profile including a spike at an intermediate stage of the method illustrated in FIG. 4, in accordance with some embodiments of the present disclosure.

Alternatively, in some embodiments, the exothermic reaction produces a "spike," such as a peak temperature T7 of about 800° C. in FIG. 7, at operation 306. The spike may be high in intensity and extend over a relatively shorter period of time. For example, the spike may peak at a temperature of about 400° C. over the initiating temperature of about 500° C., reaching above 900° C. It is noted that the peak temperature T7 depicted in FIG. 7 corresponds to a slightly lower temperature of about 800° C. due to a lag in the sensing process by the temperature gauge 146.

The exact temperature (or range of temperatures) at which the exothermic reaction occurs may be dependent upon factors including, for example, the molar ratio of the metal reducing agent to the silica precursor, the weight ratio of the thermal moderator (e.g., NaCl and/or $MgCl_2$ salt) to the combination of the silica precursor and the metal reducing agent, the size of the grains of the thermal moderator, the extent of the dealumination (e.g., indicated by an amount of $Al_2O_3$ remaining in the silica precursor after dealumination), size of the metal reductant powder, or combinations thereof. For example, adjusting the amount (e.g., the ratio described above) and the grain size of the thermal moderator can control the exothermic reaction between the silica precursor and the metal reducing agent because the thermal moderator can absorb sensible thermal energy released by the exothermic reaction until the phase change temperature is reached where latent thermal energy can also be absorbed (typically latent phase energy is orders of magnitude higher than sensible heat energy), causing the thermal moderator to melt (e.g., at about 801° C. for NaCl). For example, referring to FIG. 6, the profile 406, which corresponds to the mixture containing Mg of larger particle sizes, demonstrates a larger increase in temperature achieved during the exothermic reaction than the mixtures corresponding to the profiles 402 and 404.

At operation 308, the method 300 rapidly heats the reacted mixture after the exothermic reaction has occurred to a temperature T6 to remove certain reaction byproducts from the reacted mixture, thereby improving the yield of the exothermic reaction. In some examples, the reacted mixture may be heated to a range of at least about 560° C. to about 800° C., such as at about 750° C., and maintained at such a temperature for about 15 minutes to about 60 minutes. No exothermic reaction occurs at such temperature(s). As shown in FIG. 6, a slope of segment 430 of each of the profiles 402-406 is greater than that of the segment 420, indicating that the rate of the heating implemented at the operation 308 is greater than that at operation 306. The heating step at operation 308 improves the yield and properties of the porous silicon particles by converting reaction byproducts such as magnesium silicide ($Mg_2Si$).

Subsequently, the method 300 cools the reacted mixture, which may be in a powdered form and contain the porous silicon particles. The cooling process is indicated by segment 440 in each of the profiles 402-406 as shown in FIG. 6. In some embodiments, the cooling of the powdered reacted mixture can also be performed by indirectly cooling the product hopper 110.

In some embodiments, the thermal treatment according to the method 300 is conducted in the furnace 100 in a batch-driven process. However, the thermal treatment may additionally or alternatively be implemented in a continuous manner in the furnace 100 to achieve the same, or substantially the same, temperature profile as any of the profiles 402-406. To accomplish this, the rotational speed of the screw feeder 132, which is controlled by the motor 134, and the feed rate of the mixture, which is controlled by the feeding speed control 105, are adjusted, and the tube 106 is configured to have three different heating zones, HZ1-HZ3, set to different temperatures corresponding to those described above with respect to operations of the method 300. For example, the heating zone HZ1 may be set at a temperature corresponding to the rapid heating of the mixture at operation 304, the heating zone HZ2 may be set at a temperature (or a range of temperatures) sufficiently high for the reduction reaction at operation 306, and the heating zone HZ3 may be set at a temperature corresponding to the rapid heating of the reaction product at operation 308. The rotational speed and feed rate can determine the residence time of the mixture in each zone, thereby creating the same temperature profiles (e.g., the profiles 402-406) as the stepwise thermal treatment described in the method 300 but in a continuous manner. In some embodiments, the continuous implementation of the thermal treatment provides a scalable solution for producing the porous silicon particles at higher throughput. The scalable solution is two-fold. Firstly, indirectly-fired rotary furnaces (i.e., flames outside the rotary tube) are an established technology and commercially available to produce kilo-tons (kT) of throughput. Secondly, the combination of processing parameters described herein and implemented in the furnace 100 allows for a residence time to reduce to less than an hour, such as 15 minutes, at the upper temperature (e.g., 750° C.), which is in contrast to the many hours typically used in small-scaled batch process involving the metallothermic reduction reaction. The temperature gauge 146 (e.g., the thermocouple), can be used to produce the desired temperature profile along the longitudinal axis AA' of the tube 106.

By controlling the parameters including, for example, the molar ratio of the metal reducing agent to the silica precursor, the weight ratio of the thermal moderator to the combination of the silica precursor and the metal reducing agent, the size of the grains of the thermal moderator, the extent of the dealumination, or combinations thereof, many aspects of the thermal treatment of the mixture (e.g., according to the method 300) may be adjusted to yield silicon porous particles having a range of particle (e.g., crystallite) sizes suitable for applications including LIBs.

In some embodiments, before cooling the reacted mixture that contains the porous silicon particles and after rapidly heating the reacted mixture to the temperature T6 at operation 308, a sintering process is performed at operation 211. Generally, the sintering process involves heating the porous silicon particles to a sintering temperature that is much higher than the temperature (or the range of temperatures) required for the exothermic reaction (i.e., the reaction temperature T5) in an inert atmosphere for purposes of increasing the average crystallite size of the porous silicon particles. In some embodiments, the porous silicon particles may be sintered at about 900° C. to about 1200° C. for a duration of about 15 minutes to about four hours. In one example, the porous silicon particles may be sintered at about 1100° C. for about 15 minutes. In the present embodiments, the sintering temperature is greater than the temperature T6 as depicted in FIG. 6 and similar to the peak temperature T7 depicted in FIG. 7.

Figure 8A:
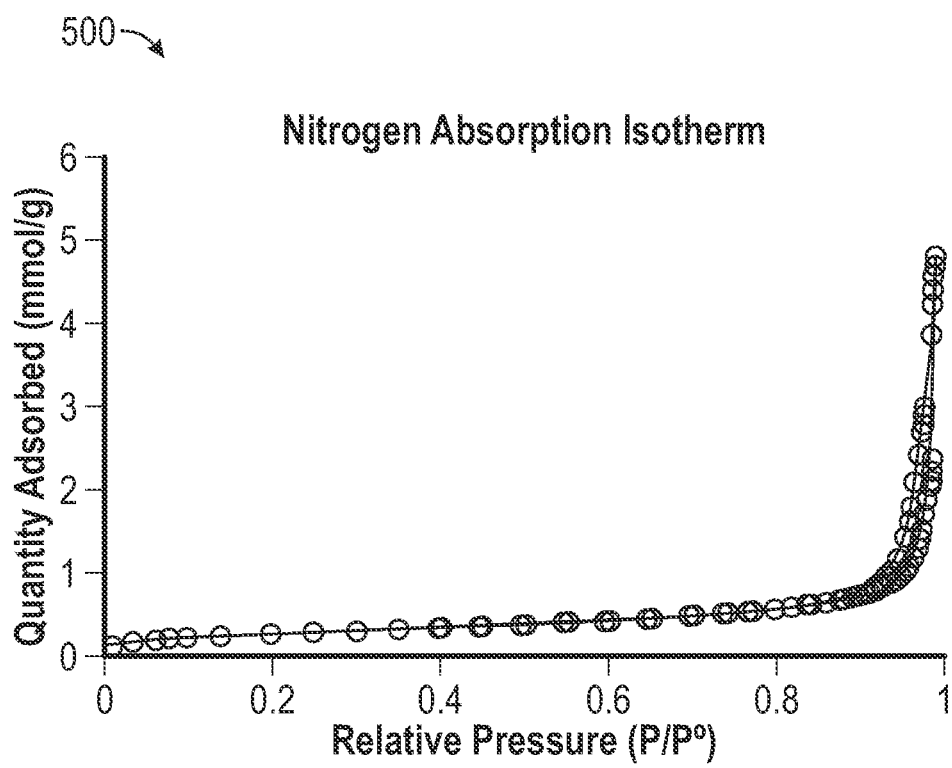
FIGS. 8A and 8B each illustrate a nitrogen absorption isotherm of samples of porous silicon particles manufactured in accordance with some embodiments of the present disclosure.
Figure 8B:
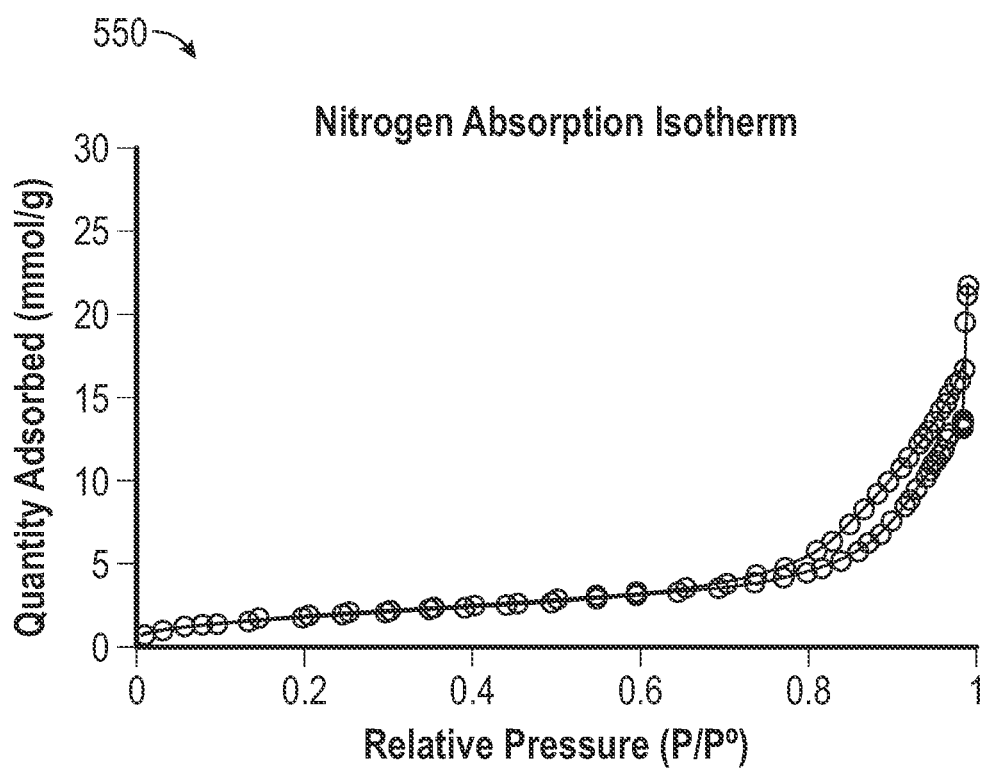

The effect of the sintering process is described in FIGS. 8A-9B. FIGS. 8A and 8B depict nitrogen absorption isotherms of samples of the resulting porous silicon particles subjected to different treatments in plots 500 and 550, respectively, and physical properties of the same samples are listed in tables of FIGS. 9A and 9B, respectively. The sample of FIGS. 8A and 9A was measured after being sintered at the operation 211, while the sample of FIGS. 8B and 9B was the same sample as that of FIGS. 8A and 9A but measured before being sintered at the operation 211.

The nitrogen absorption isotherms presented in plots 500 and 550 depict changes in quantity of nitrogen absorbed by samples of the porous silicon particles after and before undergoing the sintering process over different relative pressure. The sintered sample of FIGS. 8A and 9A is shown to have a crystallite size (or particle size) that is more than three times of the crystallite size of the un-sintered sample. Consequently, the sintered sample of FIGS. 8A and 9A demonstrated less surface area than the sample of FIGS. 8B and 9B.

In some embodiments, crystallite size of the porous silicon particles produced by the methods of the present disclosure, as depicted in FIGS. 9A and 9B, is seen as the primary driver of the physical properties such as surface area and pore volume (or porosity). For example, the sample described in FIGS. 8A and 9A, with a larger crystallite size as a result of undergoing a sintering process (described below), is shown to have less surface area and smaller pore volume in comparison to the sample described in FIGS. 8B and 9B, which has a much smaller crystallite size. In some examples, the porous silicon particles produced by the methods disclosed herein have demonstrated such physical properties that result in enhanced performance in LIP applications, including maintaining a capacity of at least about 2500 mAh/g over at least 100 cycles of operation.

Generally, during the first a few (e.g., one to three) cycles of a LIB's operation, portions of its electrolyte irreversibly break down on a surface of the anode material (e.g., silicon) and forms a passivated layer termed a solid electrolyte interphase (SEI). It is generally acceptable for the SEI to develop uniformly and robustly in experimental settings. However, in commercial applications an excessive amount of the SEI can be costly as it consumes expensive electrolyte material and compromises the LIB's performance. Initial coulombic efficiency (ICE) describes a ratio of charges (e.g., electrons) introduced to an anode to charges removed from the anode. An ICE of 100% indicates that all the electrons introduced to the anode can be removed. ICE can be used to measure an amount of the SEI formed in the first few cycles and should typically be greater than about 85% for porous silicon particles used in commercial LIB applications, suggesting that only less than about 15% of the charges in the first few cycles are broken down to form the SEI.

The sample with a relatively higher surface area produced without sintering (FIGS. 8B and 9B) demonstrated an ICE of about 74%, which is less desirable for commercial applications. In comparison, the sintered sample of FIGS. 8A and 9A demonstrated a lower surface area, which is the primary driver for SEI formation, and achieved an ICE of up to about 89%. This is an unprecedented and critical improvement for porous silicon particles in LIB applications. In existing technologies, reducing the SEI includes modifying the surface of the porous silicon particles with a carbon or an $Al_2O_3$ coating or embedding the porous silicon particles within another carbon-containing particles, for example. Such technologies reduce the SEI by physically masking or separating surfaces of the porous silicon particles from the electrolyte. In comparison, performing the sintering process at operation 211 alone has been shown to achieve a similar effect with respect to reducing the surface area of the porous silicon particles and increasing the ICE thereof, which is critical for improving the lifespan and/or enhancing the performance of the LIB. Notably, combining the surface modification process (e.g., the coating or the embedding process) with the sintering process can improve the lifespan and the properties of the porous silicon particles to an even greater extent.

In some embodiments, instead of performing the sintering process at operation 211, the effect of sintering process, such as enlarging the crystallite size to reduce the porous silicon particles' surface area, can be achieved during the thermal treatment of the method 300, such as during the exothermic reaction implemented at the operation 306. For example, by controlling factors such as the weight ratio of the thermal moderator and the rate of heating (e.g., the slope of the segment 420 as shown in FIG. 6), the exothermic reaction is allowed to spike, as described above and depicted in FIG. 7, such that the thermal energy released during the exothermic reaction causes a chain reaction capable of heating the mixture to the peak temperature T7 of at least about 900° C., which is similar to or exceeds the sintering temperature implemented at operation 211. In this regard, instead of registering a slight hump, such as that depicted in each of the portions 402S, 404S, or 406S of FIG. 6 in their respective temperature profiles, the temperature gauge 146 can register the spike at a temperature of at least about 800° C., suggesting that locally the mixture may have reached even higher temperatures, such as 1200° C., sufficient to sinter the porous silicon particles. In some embodiments, reducing the weight ratio of the thermal moderator included in the mixture leads to a larger spike in the temperature during the exothermic reaction. In some examples, a weight ratio of the thermal moderator to the reactants of greater than or equal to about 1:1 results in the spike capable of sintering the porous silicon particles. For example, the weight ratio may be about 2:1, 3:1, 4:1, or 5:1. By allowing the exothermic reaction to spike to the peak temperature T7, such as that depicted in FIG. 7, thermal conditions for both the exothermic reaction and the sintering can be satisfied, producing porous silicon particles with enlarged crystallite sizes and reduced surface area.

At operation 212, the method 200 collects the reaction product, including the porous silicon particles, from the tube 106 of the furnace 100 to an ambient environment (e.g., exposure in air). In the present embodiments, the collection of the reaction product is implemented by emptying the tube 106 using, for example, the tilting module 160. In the case of continuous process implemented in the furnace 100, the product hopper 110 can be isolated and disconnected via a hand-controlled valve at the material outlet 108.

In some embodiments, operations 206, 208, 210, 211, and 212 are performed simultaneously, or otherwise concurrently, or substantially concurrently, to allow the mixture to be passed through the tube 106 while undergoing the treatments (e.g., the thermal treatment and/or the sintering process) at elevated temperatures and in a designated gas environment (e.g., an inert environment or vacuum) such that the production of the porous silicon particles is carried out continuously. In this regard, the continuous reduction reaction improves the throughput, among other attributes, of the final product and offers a solution for scaled-up production of porous silicon particles, which is in contrast to the existing batch-driven processes (e.g., the top-down CVD deposition process and the small-scaled batch process of the metallothermic reduction reaction). In some embodiments, the arrangement of the furnace 100 also enables the porous silicon particles be produced in a batch-driven process via controls of the feeding, mixing, rotating, heating, and tilting processes, which may be implemented by one or more of the mixing module 130, the heating module 150, the tilting module 160, other components of the furnace 100, or combinations thereof.

Additionally, as the furnace 100 offers in-situ monitoring of various aspects of the reduction reaction (e.g., reaction temperature, chamber/tube pressure, feeding speed, rotation speed, tilt angle, etc.), any two of more of the operations 206-212 may be implemented in a coordinated manner as discussed in detail below.

In the present embodiments, the rotation of a heated section of the tube 106 allows the mixture including the metal reducing agent and the silica precursor to be mixed (or further mixed) during the metallothermic reduction reaction. In some embodiments, the rotation is baffled such that it redistributes the reactive mixture at a rate of about 0.1 rpm to about 20 rpm, such as about 1 rpm to about 20 rpm, which spreads the exothermic energy of the reduction reaction across the entire volume of the reactive mixture and/or the reaction product and over a wide timeframe, thereby reducing the spike in local temperature. The continuous mixing of the reactants also leads to a more even distribution of and proximity between the reactants (and the thermal moderator, for example) in the mixture, thereby controlling the reaction and improving the product yield and properties.

In some embodiments, the mixing of the reactants (and the thermal moderator, for example) in the interior cavity of the tube 106 is agitated by including a plurality of spheres (or balls), such as stainless steel balls, in the mixture. The spheres may enhance the mixing of the reactants within the tube 106, provide increased agitation during the mixing, and prevent caking of the reactants (in the form of powders, etc.) on an inner wall of the tube 106. In some embodiments, the spheres include a heat-conducting material, such as a metal or an alloy of metals, and are capable of transferring heat from the inner wall of the tube 106 toward a center of the interior cavity, providing a more homogenous heating regime, i.e., less temperature gradient present within the interior cavity of the tube 106. Additionally, the spheres may also conduct heat away from any hotspots caused by the exothermic energy released during the metallothermic reaction. Furthermore, the spheres may be used to clean the interior space of the tube 106. In some embodiments, the agitation of the spheres is baffled by the rotation of the tube 106. In some examples, other types of agitators (e.g., different geometries and/or compositions, etc.) capable of conducting heat and being distributed through the mixture within the tube 106 may also be applicable in the present embodiments.

In the present embodiments, a controllable atmospheric pressure of about 10 Pa to about 100 kPa provided by the vacuum module 170 and feeding and emptying rates controlled by the feeding speed control 105 are applied to the tube 106 during the reduction reaction. Furthermore, the reaction temperature may be controlled and monitored via the temperature gauge 146, which may be an in-situ thermocouple, and the level of vacuum may be controlled and monitored by the vacuum gauge 174, allowing control over the release of exothermic energy during the metallothermic reduction reaction.

In some embodiments, the heating module 150 and the gas module 120 may operate in coordination such that if the temperature in the interior cavity of the tube 106 rises to above a predetermined set point, an inert gas, such as Ar, will be released through the gas inlet 122. The inert gas may rapidly reduce the temperature by replacing the atmosphere within the interior cavity of the tube 106. In some embodiments, the coordinated operation may be manually monitored and controlled. In some embodiments, the coordinated operation may be executed by a computerized feedback mechanism to lower spikes in exothermic energy generated by the reduction reaction in the tube 106.

By reducing the pressure in the tube 106, the production of metal (e.g., Mg) vapor is encouraged. In the gas phase, the Mg reduction of the silica precursor can be performed at lower temperatures (e.g., form about 350° C. to about 650° C.) than the reaction involving Mg in the solid phase. With such lower initial reaction temperatures, any spike caused by the exothermic reaction may less likely elevate the reaction temperature to be near the melting points of silica or silicon. In addition, as the metal reducing agent is proliferated in the gas phase it can be more evenly distributed through the silica precursor, increasing the production yield and decreasing the reaction time. In some embodiments, the magnetic fluid sealing elements 112 and 114 provide proper sealing of the interior cavity of the tube 106, allowing the desired level of vacuum/low pressure be reached and maintained.

Furthermore, the continuous mixing and proliferation of the metal reducing agent in the gas phase allow more cost-effective forms of metallic powders to be used without relying on fine powders (e.g., 325 mesh or 280 mesh). In this regard, metal granules or chips (e.g., 10 mesh to 40 mesh) may be fed to the furnace 100 with the silicon precursor. Alternatively, as described above, powders of the metal reducing agent may be employed in the processes of the present disclosure.

In some examples, the residence time of the mixture within the tube 106 may be controlled by adjusting the screw feeder 132 (e.g., a powder feeding auger screw), the rotation speed (in rpm) of the tube 106, and the angle of tilt implemented by the tilting module 160, or combinations thereof, allowing a continuous production of porous silicon particles. Using the in-situ pressure and temperature measurement devices (e.g., the pressure gauge 124, the vacuum gauge 174, and the temperature gauge 146), the production of exothermic energy from the reduction reaction can be actively monitored and recorded. In response, the rotation speed, gas flow, vacuum level, reactant feed speed, and emptying of the vessel (e.g., via tilting) may be adjusted to reduce or avoid inadvertent overheating and destruction of the nanostructures of the resulting porous silicon particles.

In some embodiments, the thermal moderators such as NaCl and/or $MgCl_2$ or any salt with a large latent heat energy, are added to the mixture in the tube 106 in amounts of 0 wt % to 500 wt % relative to the reactants, which is lower than previously reported for similar applications. In some examples, the thermal moderator(s)' ability to buffer the temperature of the metallothermic reaction may be enhanced due to more thorough and continuous mixing.

In some embodiments, the metallothermic reaction provided herein forms porous, polycrystalline porous silicon particles, which may include primary particles having sizes on the nm-scale. In some instances, the primary particles may aggregate to form secondary particles having sizes on the nm-μm scales. The porous silicon particles may be in the form of nanotubes in some examples. The pores present in halloysite precursor may be maintained in the porous silicon particles, though the sizes of the pores may change. The pore size of the halloysite may vary based on the amount of alumina present (i.e., the extent of dealumination). Additionally, by changing one or more of the reaction temperature, vacuum level (i.e., pressure) in the tube 106, and the extent of dealumination, the pore size of the final porous silicon particles may be adjusted according to different applications. For example, increasing the temperature of the metallothermic reaction may lead to larger porous silicon particles with lower surface area.

In some embodiments, the collection of the porous silicon particles (and any accompanying metal oxide and/or metal silicide) is implemented, at least in part, by the tilting of the tube 106 using the tilting module 160.

At operation 214, the method 200 may implement additional operations including, for example, removing primary reaction byproduct(s) and removing or otherwise collecting secondary reaction products.

In some embodiments, the reaction product that includes the porous silicon particles is washed (or leached) in an acid bath, such as a hydrochloric acid (HCl) bath, to remove any unreacted silica precursor, secondary product such as MgO (see Scheme I), and/or any byproducts (e.g., $Mg_2Si$), leaving a suspension of solid silicon product (i.e., the porous silicon particles) to be collected. Factors including the concentration (e.g., the molar amount) of the acid, the temperature of the acid, and the residence time of the reacted mixture in in the acid, can be adjusted to control the acid wash process. In one example, the acid wash may be implemented using an HCl bath with a concentration of about 3 M at about 80° C. for about 15 minutes. In another example, the acid wash may be implemented using an HCl bath with a concentration of about 1 M at about 80° C. for about 70 minutes. In some examples, the duration of the acid wash may be adjusted according to the concentration of the acid bath for a given acid used. In some embodiments, the concentration and the duration of the acid wash process are adjusted based on the yield of silicon in the reaction product.

In some embodiments, the continuous metallothermic reduction reaction implemented in the furnace 100 results in a purity of about 75% to about 90% of silicon (i.e., porous silicon particles) in the reaction product. In other words, the continuous metallothermic reduction reaction can achieve a substantially complete metallothermic reduction reaction, leaving little to none unreacted precursor materials, secondary products, or byproducts. As such, the washing of the reaction product in the acid bath at operation 214 is omitted in some embodiments, reducing or minimizing the complexity the cost of the overall process, as well as any operational hazard associated with the handling of corrosive and toxic acid.

In some embodiments, such as on a 100-g scale, the collected porous silicon particles are then dewatered using a Buckner filtration method and rinsed multiple times (e.g., three times) with water slightly above room temperature (e.g., at about 40° C.) to remove any salt (e.g., MgO) and subsequently dried in an oven at about 110° C. In some embodiments, such as on a larger scale, a centrifuge and a spray drier or a paddle drier may be used instead of the filtration method and the oven, respectively. Other suitable means of implementing the dewatering and drying processes may also be applicable so long as the porous silicon particles can be dried.

When local distribution of reactants is not even, such as during a batch process not involving the continuous mixing of the reactants while undergoing the thermal treatment according to the method 300, a secondary reaction according to Scheme II below may occur in addition to the reduction reaction of silica discussed above to produce magnesium silicide ($Mg_2Si$):

$$4Mg + SiO_2 \rightarrow 2MgO + Mg_2Si \quad \text{(II)}$$

The production of $Mg_2Si$ is highly undesirable because it is completely removed during the acid washing process, thereby removing a portion of the metal (Mg) from the reactants that can otherwise be used to reduce the silica precursor, which inadvertently reduces the yield of silicon in the reaction product and increases reactant cost. During the acid washing process, $Mg_2Si$ can degrade to produce silane gas, which is pyrophoric, and therefore dangerous and inhibiting to the scalability of the reduction reaction. Such secondary reaction occurs when there is an imbalance in the local stoichiometry of the metal reducing agent and the silica precursor. The continuous mixing implemented by the furnace 100 during the thermal treatment of the method 300 reduces the occurrence of such secondary reaction and greatly improves the yield of silicon as a result.

In contrast, the continuous mixing of the reactants in the tube 106 of the furnace 100 reduces the formation of $Mg_2Si$ by constantly and evenly distributing the reactants. In addition, the use of vacuum may also proliferate the conversion of $Mg_2Si$ into a silicon product by further reacting it with $SiO_2$. Furthermore, the furnace 100 may be used in a secondary "partial oxidation" step, which can convert $Mg_2Si$ into silicon according to Scheme III below, allowing $Mg_2Si$ to be removed before implementing the acid washing process. In this regard, the furnace 100 may be operated under ambient air or oxygen environment instead of vacuum or an inert environment for the reduction of silica using a metal reactant. In some examples, the partial oxidation step may also be implemented in a separate furnace.

$$Mg_2Si + O_2 \rightarrow 2MgO + Si \quad \text{(III)}$$

Because conversion of $Mg_2Si$ in this manner consumes more Mg per gram of silicon in the reaction product, it is desirable to reduce or minimize its use. However, it does represent a useful safety tool to remove small quantities of $Mg_2Si$ that may be present in the reaction product. As described in detail above, any reduction in the amount of secondary product and/or byproducts improves the yield of silicon, which removes the need for additional processing, such as an acid bath wash.

The present embodiments also provide a scalable 1L-1000L heated tank with vacuum and inert gas capabilities. This heated tank may be used for the acid washing process to remove the metal oxide from the porous silicon particles. The heated tank may offer advantages for the removal of $Mg_2Si$, for example, as the pyrophoric gases can be collected under inert atmosphere or vacuum and safely removed without sparking. The acid leaching step may be combined with heat, negative pressure, and homogenizing (mixing/milling), which may improve the leaching time and at the same time deagglomerating any fused porous silicon particles.

In some embodiments, before removing the metal oxide (e.g., MgO) and/or metal silicide ($Mg_2Si$) by the acid wash, the metal oxide and/or metal silicide powders may first be mixed with a water-based slurry to generate hydrogen gas without any dangerous flames or sparking. Subsequently, such slurry can be more safely reacted with the acid (e.g., HCl) in the acid washing process to obtain the final product. In addition, the hydrogen gas evolution may be captured and potentially reused as a means to heat subsequent metallothermic reactions in the furnace 100.

In some embodiments, the silicon product obtained from the method 200 using the furnace 100 is mixed with a carbon material to form a silicon/carbon composite suitable for applications such as in LIBs.

In one example, the silicon/carbon composite may be formed by a step of mixing a carbon material with the silica precursor (and the metal reactant) to form a mixture and feeding the mixture into the tube 106, such as during the operation 204 of the method 200. The carbon material generally will pass through the furnace 100 unreacted, and the thermal energy produced by the metallothermic reduction may pyrolyze the carbon material, which may then react with the silicon product to form a silicon/carbon composite. As such, the present disclosure provides the advantage of a one-step synthesis of a silicon/carbon composite carried out in a single reactor (e.g., the furnace 100).

In another example, the silicon/carbon composite may be formed at a step of applying an acetylene CVD process during the metallothermic reduction process, such as during operation 206, 208, and/or 210 of the method 200. This eliminates the need for a second CVD step. Advantageously, the acetylene CVD process and the metallothermic reduction may both be performed in the furnace 100. For example, the gas module 120 may be utilized to implement the acetylene CVD process by introducing acetylene in gas phase to the tube 106 via the gas inlet 122.

The present disclosure provides many advantages to the metallothermic reduction reaction of silica. These advantages are merely examples and are not intended to be limiting.

For example, in exiting implementations, highly toxic and corrosive HF is generally used to remove any unreacted silica, secondary products, and/or byproducts. With the increased purity of the silicon product resulting from the continuous process implemented by the furnace 100, the need for using HF is removed. With an improved purity achieved by shorter reaction times and the continuous process as shown in the present embodiments, the need for HF is completely removed.

Additionally, as an improvement over the existing implementations, the metal oxide (e.g., MgO) may be captured after the acid washing process, which can be subsequently sold as a byproduct to improve the overall economic value of the silicon production.

Furthermore, according to some embodiments, by processing the halloysite to form a silica precursor of desired composition and controlling various aspects of the metallothermic reaction using the furnace 100 provided herein, a ratio of silicon:silica:alumina in the final product can be customized. In one example, the reduction reaction may be controlled to adjust the amount of the silicon product and the amount of any unreacted silica in the final product. In another example, the dealumination process may be controlled to leave more or less alumina in the silica precursor.

Further still, the metallothermic reduction reaction and the methods of implementing the same using the furnace 100 may also be applied to reduce other silica precursors, such as fine gray kaolin clay, coarse white kaolin clay, diatomaceous earth, quartz, and sepiolite, in addition to halloysite. Advantageously, the methods (e.g., the methods 200 and 300) and apparatus (e.g., the furnace 100) of implementing such methods described in the present disclosure can be applied to these and other similar silica-containing minerals to form porous silicon particles with physical and electrochemical properties suitable for forming anode electrodes in LIB applications.

With respect to the LIB applications, the more silicon in the product would result in a higher reversible capacity as an anodic material. However, in some instances, it may also be desirable to control the amounts of other materials (e.g., silica and/or alumina) in the product to mitigate the large swelling nature of silicon in LIB applications. In addition, the ability to adjust such ratio of various materials affords opportunities to control the extent of silicon conversion and hence generate products with varying capacities and stability characteristics. Furthermore, the porous silicon particles produced using the furnace 100 and the methods provided herein may be blended with graphite (e.g., at about 1 wt % to about 99 wt %). Still further, the porous silicon particles may be used in fuel-cells independent of the cathode materials they are paired with, such as nickel manganese cobalt (NMC) oxide, lithium iron phosphate (LFP) oxide, etc.

Some additional applications of the porous silicon particles may include splitting water molecules to produce hydrogen gas, which may be made more efficient by the large-scale production of silicon afforded by the method and apparatus provided in the present disclosure. Furthermore, the generated hydrogen gas may be recirculated as a combustion source to provide power for the furnace 100 and the reduction process, hence improving economics and energy intensity of the reduction process.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of producing porous silicon particles, comprising:
providing a rotary tube furnace including a tube extending between a first opening and a second opening opposite the first opening;
providing a silica precursor, a metal reducing agent, and a thermal moderator as a mixture to an interior cavity of the tube through the first opening;
rotating the tube containing the mixture;
performing a thermal treatment to the mixture in the tube to produce a reaction product that includes the porous silicon particles; and
collecting the reaction product at the second opening, wherein the steps of providing the mixture, rotating the tube, performing the thermal treatment, and collecting the reaction product are performed concurrently such that the porous silicon particles are produced in a continuous manner.

2. The method of claim 1, wherein performing the thermal treatment includes heating the mixture to a first temperature to produce the porous silicon particles, and the method further comprises heating the porous silicon particles to a second temperature to sinter the silicon particles, the second temperature being greater than the first temperature.

3. The method of claim 1, wherein the performing the thermal treatment includes heating the mixture to a first temperature to produce the porous silicon particles while releasing thermal energy, and wherein the released thermal energy subsequently heats the porous silicon particles to a second temperature greater than the first temperature, thereby sintering the porous silicon particles.

4. The method of claim 1, further comprising establishing an inert gas environment in the tube before performing the thermal treatment.

5. The method of claim 1, further comprising applying negative pressure in the tube before performing the thermal treatment.

6. The method of claim 1, wherein collecting the reaction product includes tilting the rotary tube furnace such that the first opening is raised relative to the second opening.

7. The method of claim 1, wherein the metal reducing agent includes at least one metal selected from the group consisting of magnesium, aluminum, sodium, potassium, zinc, and lithium.

8. The method of claim 7, wherein a particle size of the metal reducing agent ranges from 300 mesh to 6 mesh.

9. The method of claim 1, wherein providing the silica precursor includes:
providing a sample including an aluminosilicate;
performing a dehydration process on the sample; and
performing a dealumination process to remove aluminum from the sample, resulting in the silica precursor.

10. The method of claim 9, wherein performing the dealumination process includes performing a spray-drying process.

11. The method of claim 1, further comprising applying an acid bath to remove at least one material selected from the group consisting of silica, a metal oxide, and a metal silicide.

12. The method of claim 1, wherein a purity of the porous silicon particles is at least 75% such that the method does not include applying an acid bath.

13. The method of claim 1, wherein the thermal moderator includes at least one material selected from the group consisting of sodium chloride and magnesium chloride.

14. The method of claim 13, wherein the thermal moderator includes a first amount of particles having a first mesh size and a second amount of particles having a second mesh size, the first mesh size being less than the second mesh size and the first amount being less than the second amount.

15. The method of claim 14, wherein the first mesh size is 325 and the second mesh size is 80.

16. A method of producing silicon particles, comprising:
providing a rotary tube furnace including a tube that extends between a first opening and a second opening opposite the first opening;

receiving a mixture in an interior cavity of the tube through the first opening, the mixture including a silica precursor, a metal reducing agent, and a salt;

rotating the tube containing the mixture;

performing a thermal treatment on the mixture in the tube, resulting in a reaction product that includes the silicon particles;

sintering the silicon particles; and collecting the sintered silicon particles at the second opening, wherein the steps of receiving the mixture, rotating the tube, performing the thermal treatment, and collecting the reaction product are performed in a continuous manner.

17. The method of claim 16, wherein performing the thermal treatment includes:

heating the mixture to a first temperature;

heating the mixture to a second temperature greater than the first temperature, resulting in an exothermic reaction that forms the reaction product; and subsequently heating the reaction product to a third temperature greater than the second temperature.

18. The method of claim 17, wherein sintering the silicon particles includes heating the silicon particles to a fourth temperature greater than the third temperature after performing the thermal treatment.

19. The method of claim 17, wherein the exothermic reaction releases thermal energy capable of heating the reaction product to a fourth temperature greater than the third temperature, thereby sintering the silicon particles.

20. The method of claim 16, wherein the mixture includes the silica precursor and the metal reducing agent at a molar ratio of 1.5:1 to 2.5:1.

\* \* \* \* \*